US007627581B2

(12) United States Patent
Flam

(10) Patent No.: US 7,627,581 B2
(45) Date of Patent: Dec. 1, 2009

(54) SYSTEM AND METHOD FOR AUTOMATED PROCESS CONTROL

(75) Inventor: Ran J. Flam, Port Monmouth, NJ (US)

(73) Assignee: Sparta Systems, Inc., Holmdel, NJ (US)

( * ) Notice: Subject to any disclaimer, the term of this patent is extended or adjusted under 35 U.S.C. 154(b) by 239 days.

(21) Appl. No.: 11/668,669

(22) Filed: Jan. 30, 2007

(65) Prior Publication Data

US 2007/0124337 A1 May 31, 2007

Related U.S. Application Data

(62) Division of application No. 09/930,698, filed on Aug. 15, 2001, now Pat. No. 7,216,132.

(60) Provisional application No. 60/225,532, filed on Aug. 16, 2000.

(51) Int. Cl.
*G06F 7/00* (2006.01)

(52) U.S. Cl. ............... 707/10; 707/1; 707/3; 707/100; 707/200; 705/1; 705/26; 705/52

(58) Field of Classification Search ............. 707/1–6, 707/10, 100–102, 104.1, 200; 705/1, 26, 705/52

See application file for complete search history.

(56) References Cited

U.S. PATENT DOCUMENTS

| 5,119,476 A | 6/1992 | Texier |
| 5,371,675 A | 12/1994 | Greif et al. |
| 5,414,809 A | 5/1995 | Hogan et al. |
| 5,528,745 A | 6/1996 | King et al. |
| 5,546,525 A | 8/1996 | Wolf et al. |
| 5,630,125 A | 5/1997 | Zellweger |

(Continued)

OTHER PUBLICATIONS

"Query: The Language of Databases"—Hammond, W. Ed. M.J. Straube, P.B. Blunden and W. W. Stead—Duke University Medical center—Proc. SCAMC—1998 (pp. 419-423).*

(Continued)

*Primary Examiner*—John E Breene
*Assistant Examiner*—Anh Ly
(74) *Attorney, Agent, or Firm*—Gordon E. Nelson

(57) ABSTRACT

A process control system that automatically monitors processes and performs activities based on conditions detected during monitoring. The information needed to do the monitoring and perform activities is contained in tables in a database system. The process control system may be configured by configuring entries in the tables. An administrative query table has records that define administrative queries. Each administrative query has associated with it a query to be executed on a table of process records that indicate statuses of the processes being monitored, a scope that defines a subset of the process records upon which the query is to be executed, a schedule from which a time of next execution of the administrative query can be computed, and an activity. The activity is a set of one or more actions. When an administrative query is executed and the query associated with the administrative query is run on the table of process records and the result set is not empty, the activity is performed with regard to the process records of the result set. A plurality of activities may be associated with the administrative query, with the activity to be performed being selected on the basis of a state of a given process record with regard to the query.

17 Claims, 8 Drawing Sheets

U.S. PATENT DOCUMENTS

| | | | |
|---|---|---|---|
| 5,778,387 A * | 7/1998 | Wilkerson et al. | 707/202 |
| 5,812,133 A | 9/1998 | Schultz et al. | |
| 5,960,404 A * | 9/1999 | Chaar et al. | 705/8 |
| 5,966,716 A | 10/1999 | Comer et al. | |
| 5,969,705 A | 10/1999 | Fisher et al. | |
| 6,011,560 A | 1/2000 | Stiles | |
| 6,057,841 A | 5/2000 | Thurlow et al. | |
| 6,058,426 A * | 5/2000 | Godwin et al. | 709/229 |
| 6,061,506 A * | 5/2000 | Wollaston et al. | 703/23 |
| 6,078,924 A * | 6/2000 | Ainsbury et al. | 707/101 |
| 6,141,647 A * | 10/2000 | Meijer et al. | 705/1 |
| 6,345,259 B1 * | 2/2002 | Sandoval | 705/7 |
| 6,384,848 B1 | 5/2002 | Kojima et al. | |
| 6,415,028 B1 * | 7/2002 | Bauer et al. | 707/7 |
| 6,415,297 B1 * | 7/2002 | Leymann et al. | 707/201 |
| 6,519,601 B1 * | 2/2003 | Bosch | 707/100 |
| 6,636,868 B1 * | 10/2003 | Bauer et al. | 707/104.1 |
| 6,714,979 B1 * | 3/2004 | Brandt et al. | 707/10 |
| 6,985,901 B1 * | 1/2006 | Sachse et al. | 707/10 |
| 7,076,727 B1 * | 7/2006 | Flam et al. | 707/101 |
| 7,127,460 B2 * | 10/2006 | Nixon et al. | 707/8 |
| 7,263,533 B2 * | 8/2007 | Bauer et al. | 707/104.1 |
| 7,266,764 B1 * | 9/2007 | Flam | 707/102 |
| 7,272,815 B1 * | 9/2007 | Eldridge et al. | 717/101 |
| 2002/0055878 A1 * | 5/2002 | Burton et al. | 705/26 |
| 2003/0004952 A1 * | 1/2003 | Nixon et al. | 707/10 |
| 2003/0066032 A1 | 4/2003 | Ramachandran et al. | |
| 2003/0177140 A1 | 9/2003 | Debard et al. | |

OTHER PUBLICATIONS

"Impact of the Internet on customer service and product development among the CENDI Agencies"—Gail Hodge—CENDI User Education Working Group, workshops held Feb. 4, 1997 and Apr. 8, 1997 (p. 1-31).*

Notice of References in Office Action in parent application mailed Sep. 9, 2005—see attached.

Notice of References in Notice of Allowance of parent application mailed Jan. 17, 2007—see attached.

Burk, Robin, et al., UNIX System Administrator's Edition, 2nd Edition, Sam's Publishing, Indianapolis, IN, (c) 1998, pp. 181-184, 687 and 928-944.

Gillespie, Richard, et al., PeopleSoft Developer's Handbook, McGraw-Hill Publishing, New York, NY, (c) 1999, pp. 21-24, 464-473 and 509-528.

Deitel, H.M, et al., Java: How to Program, 2nd Edition, Prentice Hall, Upper Saddle River, NJ, (c) 1998, pp. 779-794 and 944-950.

Jennings, Roger, Special Edition Using Access 97, 2nd Edition, Que Corp., Indianapolis, IN (c) 1997, pp. 402-410, 443-447, 466-468, 828-831 and 844-846.

* cited by examiner

SYSTEM AND METHOD FOR AUTOMATED PROCESS CONTROL

CROSS-REFERENCE TO RELATED APPLICATIONS

The present application claims priority from U.S. provisional application 60/225,532, Ran J. Flam, System and method for automated project scheduling, filed Aug. 16, 2000 and is a divisional of U.S. Ser. No. 09/930,698, Ran J. Flam, System and method for automated process control, filed Aug. 15, 2001 now U.S. Pat. No. 7,216,132.

STATEMENT REGARDING FEDERALLY SPONSORED RESEARCH OR DEVELOPMENT

Not applicable.

THE NAMES OF THE PARTIES TO A JOINT RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Field of the Invention

This invention relates to the field of process control, and more particularly to techniques for using a database system to implement a table-driven process control system.

2. Description of Related Art

To date, the use of computers in process control systems has typically been limited to employing a calendar-date activation system that reminds the operator when an activity is due to be performed. Conventional process control systems suffer from a major drawback. Typically, they rely on a singular input, such as calendar date and time, and require human interaction to respond to such events and their recurrence and to make decisions and take action accordingly; an example of such a system is Outlook, manufactured by Microsoft Corporation, with its reminder capability.

Other systems have filters which can account for a given set of conditions and take actions accordingly; an example of such a system is the AR System by Remedy Corporation. Even though that system can monitor for multiple pre-defined conditions in the process and can schedule the monitoring and any actions taken in response to the monitoring, the scheduling is limited to scheduling a single occurrence of the monitoring and the associated actions at a predetermined date or time or at a recurring fixed time interval. Furthermore, although this system has the ability to detect a recurring match of a given set of conditions so that additional, and possibly different, actions can be taken based on a time interval, as is required when a problem persists and must be escalated, the users can neither configure the time intervals nor the actions themselves; rather they can only select from a fixed set of component choices. The components themselves are not user-definable, and therefore limit the extensibility of the escalation functionality.

Available systems are further limited to doing their monitoring at infrequent intervals, since the monitor always has the same response to a given condition. If the monitoring is done frequently, say every 10 minutes, the result is a flood of redundant responsive actions unless the output of responsive actions is simply curtailed after a fixed number has been sent over a given period of time. Neither infrequent monitoring nor ignoring the monitoring is conducive to the timely detection of events and conditions in a process that is being controlled.

Moreover, existing systems lack the ability to perform responsive actions based on an overall count of process records matching a given set of conditions, and beyond that, they lack the ability to respond to trends over time with regard to such counts. Existing systems are therefore unable to provide proactive responses that can eliminate the need to take corrective actions.

Although computer programs can always be developed to implement responses to specific conditions arising during a process and to particular sequences of conditions, such programs are of limited use, as they require code changes whenever new conditions and new requirements arise. Moreover, program code is by its nature general, and user-made modifications to a process control system's code can have consequences for the system that go far beyond what the user intended.

Because of these deficiencies, there are presently no process control systems available that are able to control processes that require many different process-related criteria to be continuously monitored and actions taken in response thereto at pre-determined times and time intervals and where the conditions justifying a certain action may vary substantially from one process to another, as may the need to respond to a persistent set of conditions. Moreover, such process control systems as have been devised to monitor complex processes are not easily or safely configurable or modifiable by their users.

It is therefore an object of the present invention to overcome the above described deficiencies: to eliminate the dependency of such systems on human operators; to allow frequent monitoring of conditions and selective execution of responsive actions to occur at predetermined times and time intervals; to provide timely responses; to automatically detect states of persistent conditions and execute different actions as needed, based on the recurrence of given conditions, and based on elapsed time between responsive actions; to provide the ability to take responsive actions based on trends, so that such actions are proactive, rather than reactive; and finally, to configure a system that performs such monitoring and executes responsive actions in a safe and user-friendly manner and thereby reducing the need to use skilled people to adjust a process control system to evolving needs in a timely way.

BRIEF SUMMARY OF THE INVENTION

The foregoing object of the invention is achieved with a process control system that has a server which has access to a database system and executes program code for the process control system. The database system includes a table of process records, each of which indicates a current status of a process being controlled by the system and a table of administrative query records, each of which specifies an administrative query that is associated with a query on the table of process records and with an administrative activity. When executed, a portion of the program code selects one of the administrative queries for execution, executes the query associated with the administrative query, and performs the administrative activity associated with the administrative query with regard to the result set returned by the associated query.

Other aspects of the invention include association of the administrative query with future scheduling information to which the program code, when executed, responds by scheduling a future execution of the administrative query, and association of the administrative query with scope information that specifies a subset of the process records, to which the program code, when executed, responds by taking the result set from the subset of the records specified in the scope information. The query, the future scheduling information, and the scope information are all contained in records in tables in the database and an administrative query record specifies its query, scope, and future scheduling information by specifying records in those tables.

Another aspect of the invention is the association of more than one administrative activity with an administrative query record. A log table in the database system contains information from which a state of a given process record returned by a given execution of the administrative treaty may be determined, and which of the administrative activities is performed depends on the state of the given process record. Moreover, the states may have more than one administrative activity associated with them, and which administrative activity is performed for a given execution of the administrative query depends on the substate. Whether an administrative activity is performed in a substate may depend on a temporal or other condition. Information specifying the substate is in the log table.

Further, an administrative activity includes one or more actions which are executed when the administrative activity is performed. There are many types of actions, including actions which modify a process record in the result set, actions which post activities in an activity table in the database system, and actions which generate reports. The actions are defined in records in action tables in the database system, with an action table for each kind of action. Administrative activities are represented by administrative activity type records in an activity type table in the database, and each action record for an action belonging to an activity has an identifier for the activity's record in the activity type table. The administrative query record is also associated with identifiers for the activity type records for the activities performed when the administrative query is executed.

Finally, the database includes an administrative query trend table. A record in the administrative query trend table is associated with an administrative query and specifies an administrative action that is to be performed in response to a trend concerning the associated administrative query.

The foregoing and other objects and advantages of the invention will be apparent to those skilled in the arts to which the invention pertains upon perusal of the following Detailed Description and drawing, wherein:

In the following discussion, reference numbers are used to refer to components of the invention. Each reference number has two parts: the rightmost two digits are a number within a figure; the remaining digits are a figure number. The figure number is the number of the figure in which the component first appears. Thus, the first appearance of a component with the reference number 203 will be in FIG. 2

DETAILED DESCRIPTION OF THE INVENTION

The following Detailed Description will begin with an overview of an embodiment of the invention, continue with a detailed description of the tables making up the invention and the relationships between them, and conclude with a detailed description of the operation of the invention.

Figure 8:
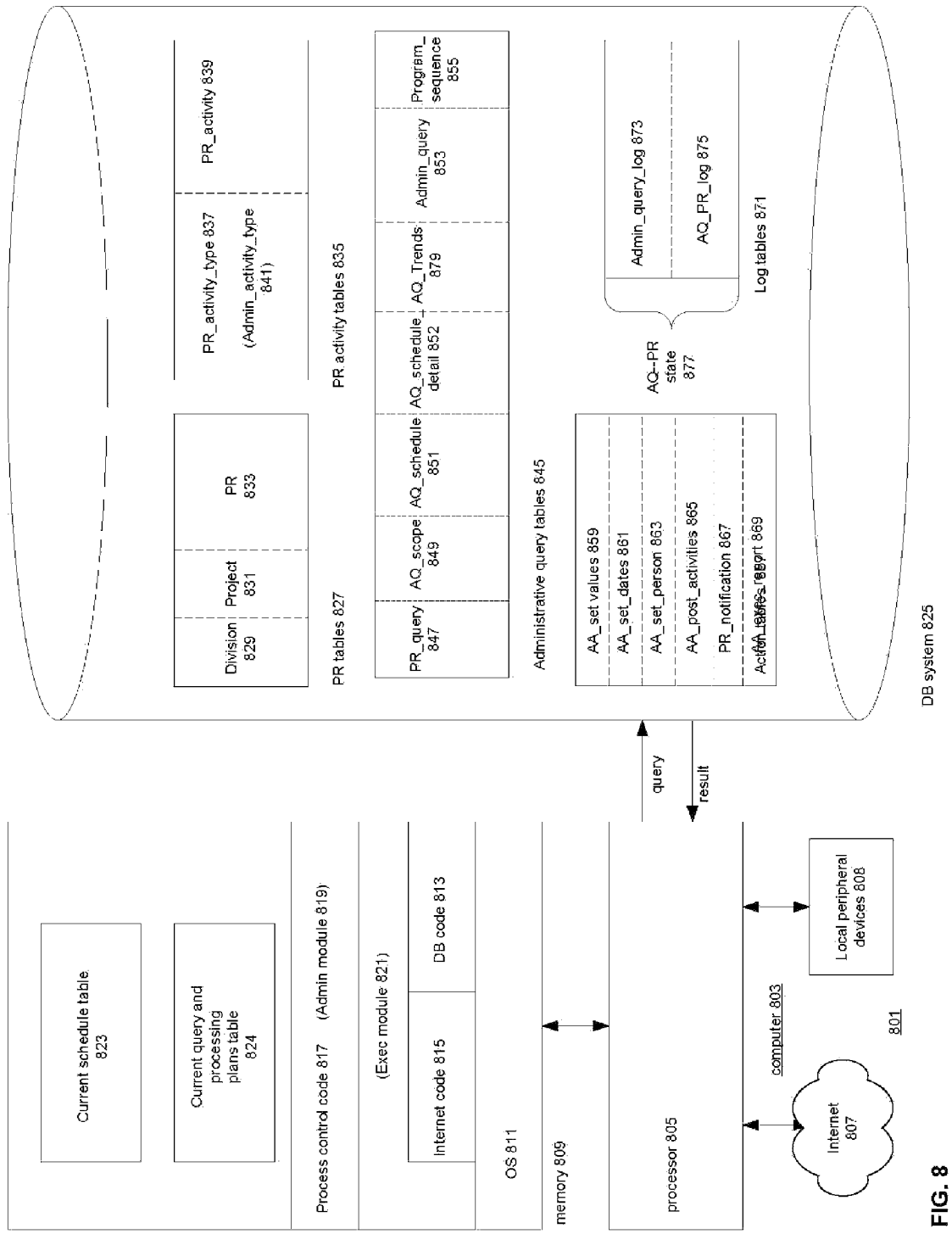
FIG. 8 is an overview of an implementation of the process control system of the present invention.

Overview of the Invention—FIG. 8

FIG. 8 shows an overview of an embodiment of automated process control system 801 that is constructed according to the principles of the invention. The embodiment is used to control business processes such as handling orders or customer complaints, but the techniques of the invention can be employed equally well in systems that control industrial or technical processes such as oil refining, electric power generation, or telephone or packet switching.

System 801 is implemented using a standard computer 803 that is connected to a standard database system 825. In a preferred embodiment, the database system is a relational database system made by Oracle Corporation, of Redwood City, Calif. Standard computer 803 has a processor 805 which is connected to Internet 807 and to local peripheral devices 808 as well as to database system 825. Processor 805 has a memory 809 (understood to include both physical and virtual memory) which includes code executed by processor 809. Of interest to the present discussion is standard operating system code 811, Internet code 815, for performing functions such as email and interacting with Web pages according to the HTTP protocol, Database code 813, which is part of and controls the operation of database system 825, and process control code 817, which is application code that implements the process control system. Process control code 817 uses components of the operating system 811, Internet code 815, and DB code 813 to interact with Internet 807, local peripheral devices 808, and DB system 825. With regard to the interaction with DB system 825, process control code 817 issues queries to DB system 825 and receives the results of the queries from DB system 825.

In broad terms, process control system 801 works by making records of processes that are being controlled in a table in database system 825 and using predefined queries that are stored in a table database system 825 to repeatedly query the table and perform activities that are predefined for the query on the result set of records returned by the query. The repeated queries are executed automatically by system 801. The predefined and automatically executed queries are termed herein administrative queries. An activity is made up of a number of predefined actions, and when the activity is performed, system 801 executes its actions. The activities to be performed by an administrative query, as well as an activity's actions, are also defined by entries in tables in the database system, and log tables in the database system determine the state of a process record returned by the administrative query with regard to that execution of the administrative query. When an execution of a query returns a process record, system 801 uses the state information to determine what activity is to be performed with regard to the process record.

Current schedule table 823 in memory 809 contains an entry for each administrative query which system 801 is repeatedly executing; the entry for the query in table 823 includes the time for the next execution of the query by system 801. Current query and processing plans table 824 is an optimization; when system 801 begins execution of an administrative query, it reads the information needed to execute the administrative query and perform any activities associated with it from the records in database system 825 that define the query and the activities and stores the information in table 824, where it is quickly and easily available to system 801 for use during the execution of the administrative query. Tables 823 and 824 are updated whenever system 801 checks database system 825 and finds that configuration tables have changed; such update of table 823 and 824 is then performed based on the configuration information fetched from database system 825.

As would be expected from the above overview, database system 825 includes PR tables 827, which are the tables that contain the records for the processes, PR activity tables 835, containing records that define and log the activities, action tables 857, whose records define the actions that make up an activity, and administrative query tables 845, which define the administrative queries that system 801 may execute on the PR tables 827. The definition of an administrative query includes the query, one or more activities to be performed, and the intervals at which the administrative query is to be made. Log tables 871 keep track of the state of a process with regard to a query and also chart trends in the processes being controlled. Log tables 871 and program sequence 855 together permit the activity that is performed when a query finds a PR record to be selected according to the state of the PR record with regard to the current execution of the administrative query.

To give a concrete example, one type of process that can be controlled by system 801 is a customer complaint. The exemplary process for dealing with a customer complaint is to assign it to a customer complaint specialist. The customer complaint specialist is to investigate the complaint and reply to the customer within a set time period. If the reply is not timely, the complaint is escalated to the customer complaint specialist's supervisor, again with a time limit for the supervisor to deal with the problem. The activity that corresponds to the escalation is the dispatch of an email message to the supervisor. In system 801, when the complaint arrives, a PR record for the complaint is made in a table in PR tables 827. When the complaint specialist replies to the customer, the PR record is altered to indicate that the complaint specialist has replied and the time of the reply. System 801 periodically runs a query contained in administrative query tables 845 which queries PR table 833 for PR records that indicate that the complaint specialist has not timely replied. The query further specifies that when the complaint specialist has not timely replied, the activity to be performed is to escalate the complaint by sending email to the supervisor. When system 801 finds such a record, it performs the specified activity, as defined by records in PR activity tables 835 and in action tables 857. System 801 records the time at which the query was run, the fact that the PR record was found and the activity performed in log tables 871. As will be explained in detail later, one function of log tables 871 is to record the state of a process with regard to a given PR record and a given execution of a query and to permit different executions of the given query to result in different activities being performed for the given PR record, depending on the state of the process. For instance, once the escalation is recorded in the log tables with regard to the query and the PR record, further executions of the query will not result in repeated escalation activities. In the terminology that is used in the following, once the query has resulted in the performance of the escalation activity for the given PR record, the given PR record is in a state of Persistent Conditions with regard to the query and because the given PR record is in the state of Persistent Conditions, the escalation activity is not repeated.

The use of tables in DB system 825 to determine the behavior of the process control system makes system 801 highly configurable, but limits the configurability so that it can be safely done by non-technical users of system 801. All of the tools provided by DB system 825 for configuring entries in its tables are available to configure the entries in the tables of system 825, as are the user interfaces which DB system 825 provides for those tools. These user interfaces strongly limit the amount of damage that can be done to the tables, and thereby to system 801, by an unskilled user. For example, only a system manager may be permitted to define tables or add tables to or delete them from the database; a less skilled user may be permitted only to add or delete records in existing tables, and a completely unskilled user may be permitted only to modify fields in existing records. System 801 is made still more safe and easy to use by a graphical user interface that is implemented on top of the user interfaces provided by DB system 825. Using the graphical user interface, the user of the system can define PR records as required for the occurrences that are important to his or her processes, can define his or her own PR activities in PR activity tables 835, can define his or her own queries in administrative query tables 845, including the activities to be performed in response to the queries, and can define an activity's actions in detail in action tables 857. What can be done by a given action is limited by the form of its record in the action table to which it belongs, and this, too, greatly contributes to the safety with which system administrative queries can be configured. In defining the activities to be performed, the user can further define states for the process represented by the record and the activities to be performed in the various states. Both configuration and query execution are done by process control code 817, which accordingly includes an execution module 821, which executes queries and schedules next executions in current schedule table 823 and an admin module 819, which adds records to and deletes them from the tables and configures the individual records. System 801 can run on a single computer 803, which functions as a server for the system, or alternatively it can run concurrently on a plurality of servers for load balancing purposes.

Figure 6:
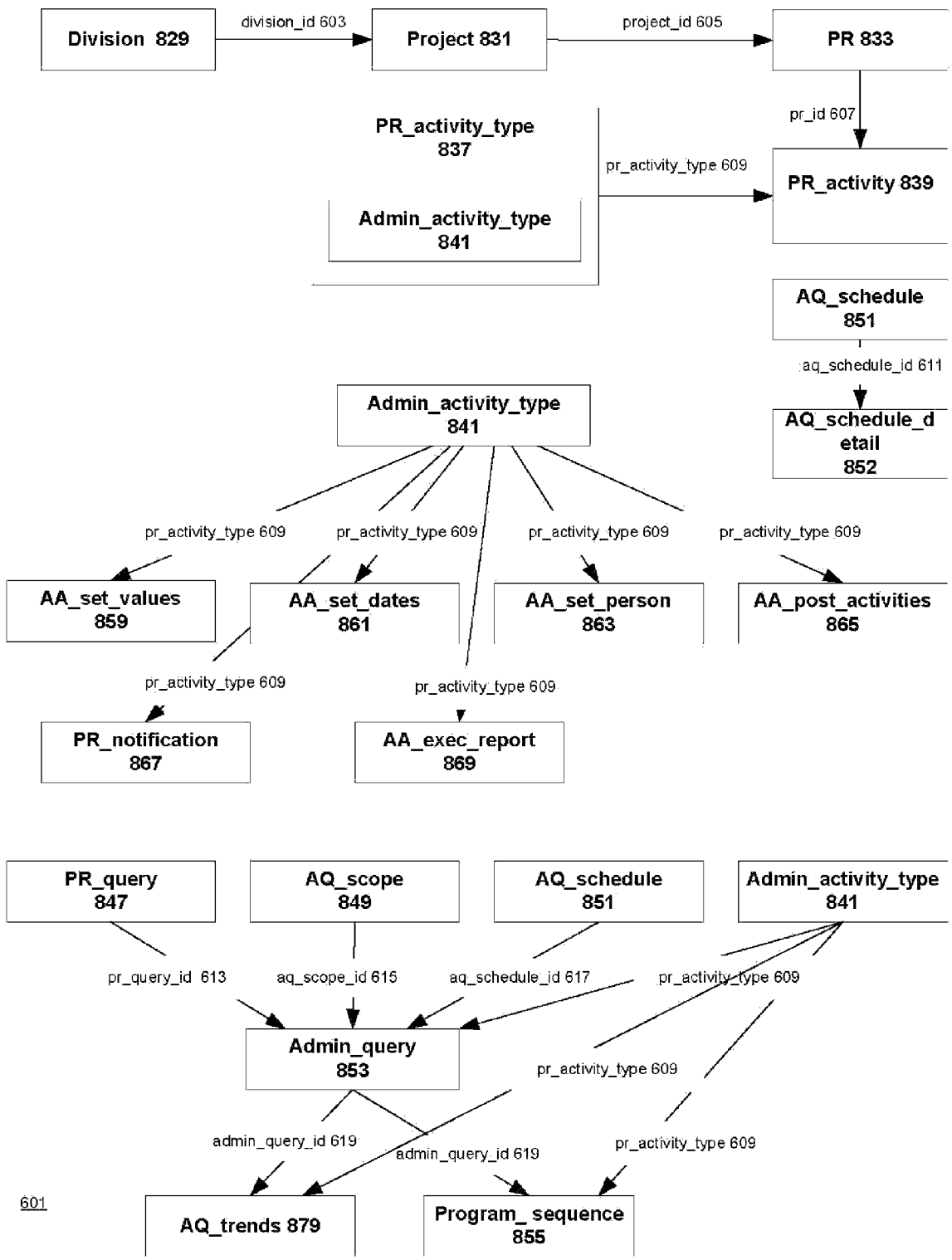
FIG. 6 is a first entity-relation diagram showing relationships between database tables in the present invention.
Figure 7:
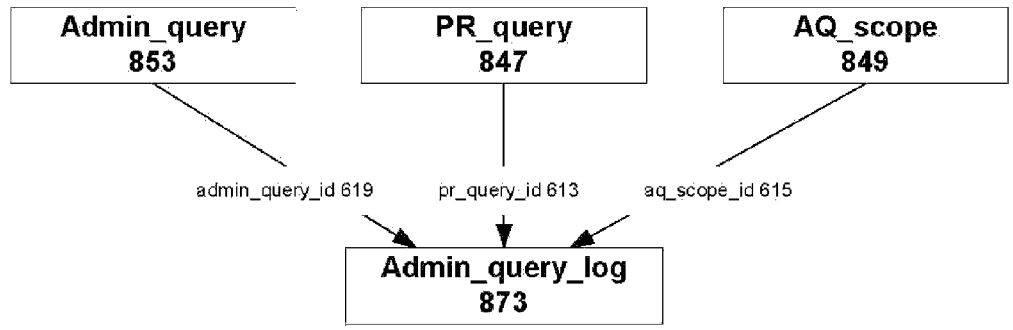
FIG. 7 is a second entity-relation diagram showing relationships between database tables in the present invention.
Figure 7:
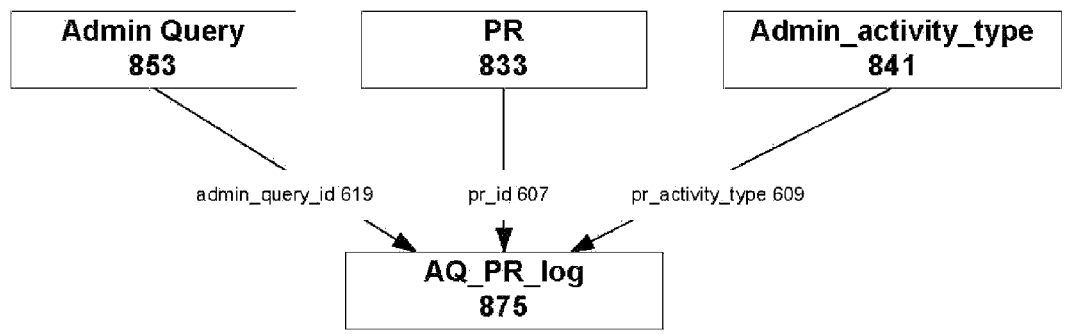
Figure 7:
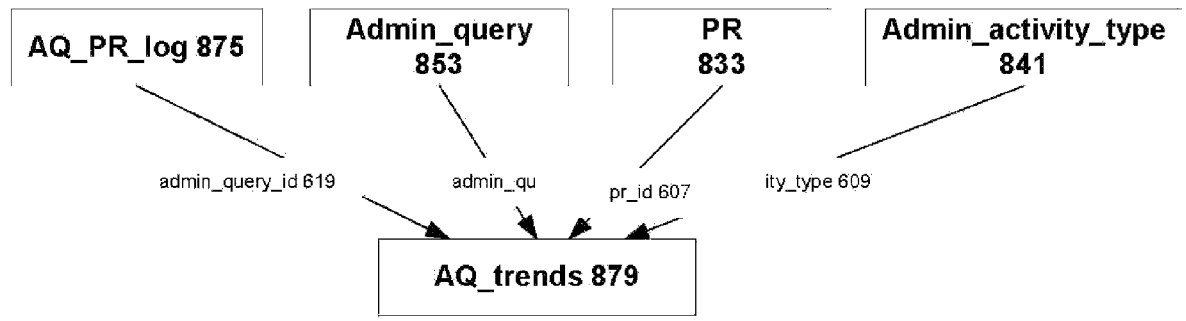

Relationships between the Tables in DB System 825: FIGS. 6 and 7

FIGS. 6 and 7 are entity-relationship diagrams which show relationships between the database tables of system 601 which are important in the present context. In relational database systems generally, tables are related to each other by values in the tables records. For example, each record in a first table may have a record identifier field that contains a unique identifier for the record. Each record in a second table may have a record reference field that contains a value which is one of the unique identifiers for the records in the first table. The unique identifier for a given record in the first table may be used in a query to locate records in the second table whose record reference field contains the given record. Similarly, the value of the record reference field may be used in a query to locate the record in the first table whose record identifier field has the value contained in the record reference field in the second table's record. It should be noted here that the relationships between records in tables may be one-to-many, as in the case of the relationship between a given record in the first table and the records in the second table whose record reference field contains the given record's unique identifier, or one-to-one, as is the relationship established by the unique identifier value between a given record in the second table and a record in the first table.

In FIGS. 6 and 7, boxes representing the tables of FIG. 8 are connected by arrows that are labeled with the name of a field whose value is a unique identifier for a record in the table which is the source of the arrow. Values from that field also appear in the records of the table which is the destination of the arrow and relate those records to the record whose unique identifier they contain. The relationship between a record in the table which is the source of the arrow and records in the table which is the destination is generally one-to-many, but is in some cases one-to-one.

These relationships between records in the tables are used to organize the data in the database. For example, in system 801, the records representing processes that are being controlled by system 801 are in PR table 833, which contains one record per process being controlled. In system 801, the user can group the records in PR 833 by project, and can group projects by division. The subdivision is done by means of Project table 831 and Division table 829. Each record in PR table 833 has a field, project_id, whose value is an identifier for a record in Project table 831, and that record identifies the project that the record in PR table 833 belongs to. Each record in Project table 831 has a field, division_id 603, whose value identifies a record in Division table 829, and that record identifies the division that the record in Project table 831 belongs to. A query on PR table 833 by a given value of project_id 605 will return all of the records in PR table 833 for processes that belong to that project. Project table 831 and Division table 829 are related in the same way by division_id 603.

A set of relationships that is particularly important for the present discussion is the set of relationships between the tables PR 833, PR_activity 839, PR_activity_type 837, Admin_activity_type 841, Action tables 857, Admin_query 853, and Program_sequence 855. All of these tables have to do with the performance of activities for processes. There are two broad classes of activities—ones done by human users of system 801 and ones done by system 801 itself in connection with executions of administrative queries on PR table 833 that return non-empty result sets. The latter activities are termed administrative activities. The administrative activities are performed with reference to the PR records of the result sets. In the present context, we are primarily concerned with administrative activities.

An important feature of system 801 is that a user can define his or her own activities. The mechanism for doing this is PR_activity_type table 837, whose records represent descriptions of activities. Each such description is termed herein a PR activity type. Fields in other tables of FIGS. 6 and 7 whose values are identifiers for PR_activity_type records have the name pr_activity_type, which appears at 609 in FIGS. 6 and 7. The PR_activity_type records that represent descriptions of administrative activities form a logical subtable of PR_activity_type table 837. This subtable appears as Admin_activity_type table 841 in FIGS. 6-8. In the following, the descriptions in subtable 841 are termed herein Admin activity types.

An Admin activity type is effectively a kind of program for the administrative activity. When system 801 performs an administrative activity, it executes the Admin activity type for the administrative activity with regard to a specific PR record returned by an execution of an administrative query. One can thus speak of an execution of an Admin activity type with regard to a given PR record. As is generally the case with programs, the specific activity resulting from a given execution of an Admin activity type may depend not only on the Admin activity type, but also on values contained in the PR record with regard to which the Admin activity type is being executed. Which Admin activity type is selected for execution may further depend on the state of the given PR record with regard to the execution of the administrative query.

When system 801 executes an Admin activity type, it performs one or more actions. Each of the actions is described in a record in action tables 857. Each record in action tables 857 is related to a specific Admin activity type by a field in the action table record whose value is the identifier for the Admin activity type's record in PR_activity_type table 841, as seen in FIG. 6. There can thus be many records in action tables 815 related to a given Administrative activity type. When the Administrative activity type is executed, all of the action table records related to the Administrative activity type are executed. The result of the execution of a given action table record may depend on values in the PR record with regard to which the Admin activity type is being executed.

PR_activity table 839, finally, is a table whose records represent activities that have been performed or are scheduled to be performed with regard to a given PR record. Thus, as shown in FIG. 6, each PR_activity record includes a unique identifier (pr_id 607) for a record in PR 833 and a unique identifier (pr_activity_type 609) for the record in PR_activity_type table 837 that represents the PR activity type for the activity represented by the record. In the case of administrative activities, the record in PR_activity table 839 represents the activity which system 801 performs when it executes the Admin activity type specified by pr_activity_type 609 on the PR record specified by pr_id 607.

As shown in FIG. 6, each record representing an administrative query in Admin_query table 853 includes a unique identifier for a record in PR_activity_type table 837. The record is the Admin activity type which system 801 executes the first time the administrative query returns a given PR record to perform the initial administrative activity. It has already been indicated that when consecutive executions of the administrative query return the given PR record, the given PR record is in a state of Persistent Conditions with regard to the administrative query and on subsequent executions of the administrative query, system 801 may perform administrative activities other than the initial administrative activity with regard to the PR record. Administrative activity types for these other administrative activities are specified in records in Program_sequence table 855 that are associated with the administrative query, and accordingly, each of these records includes a unique identifier for a record in PR_activity_type table 853.

Details of PR Tables 827

As already explained, there is a record in PR table 833 for each process being controlled by system 801, and Project table 831 and Division table 829 organize the PR table records by project and the projects by divisions.

PR Table 833

A record in PR table 833 looks like this:

```
PR(
    id                   NUMBER(12) NOT NULL,
    project_id           NUMBER(12),
    ref_number           VARCHAR2(40),
    name                 VARCHAR2(80),
    parent_id            NUMBER(12),
    status_type          NUMBER(6),
    category_type        NUMBER(6),
    reason_opened_type   NUMBER(6),
    priority_type        NUMBER(6),
    severity_type        NUMBER(6),
    exposure_type        NUMBER(6),
    entity_id            NUMBER(12),
    customer_rel_id      NUMBER(12),
    originator_rel_id    NUMBER(12),
    responsible_rel_id   NUMBER(12),
    required_time        NUMBER(10,2),
    required_cost        NUMBER(12,2),
    date_opened          DATE,
    date_due             DATE,
    date_closed          DATE,
    date_last_activity   DATE,
    date_current_state   DATE,
    is_closed            NUMBER(1),
    date_created         DATE NOT NULL,
    date_updated         DATE NOT NULL,
    created_by_rel_id    NUMBER(12),
    updated_by_rel_id    NUMBER(12),
    primary key(id)
)
```

PR table 833 contains all process records (PR records) in the database. The data fields in this table describe a process and contain such information as priority, customer and date due. A first group of the fields must appear in every PR record; other fields may be added as required by the application. The other fields in the present example offer a typical example of how a PR record may be configured.

Essential Fields

The essential fields of a PR record are: (a) id: a unique ID for the record in this table, referred to in FIGS. 6 and 7 as pr_id 607, (b) project_id: the ID of the record in Project table 833 for the project that the project represented by the given PR record belongs to, (c) date_created: the exact date/time that a given PR is created, i.e., that the given row into the PR has been inserted, (d) date_opened: the date/time that the associated process, event, etc. should be associated with, e.g., the date/time that a customer called with a request, (e) parent_id: the ID of a parent PR, if any, (f) status_type: current status of the PR, e.g., "Opened", and "Work in Progress", (g) is_closed: a Boolean value indicating whether a PR is closed or is still active, (h) date_due: the date due for completing a process, i.e., date due for closing a PR, (i) created_by_rel_id: a specific ID of a person who created the given PR record in the database, (j) originator_rel_id: a specific ID of a person who is considered the originator or the "sponsor" of the given PR, (k) responsible_rel_id: a person that is assigned to the given PR, referred to as the Assigned To, (l) updated_by_rel_id: a specific ID of a person that the given PR was last updated by, (m) date_current_state: a date/time that the status of the given PR was last changed, (n) date_closed: a date/time that the given PR was closed, if at all, (o) date_last_activity: a date/time that a PR Activity was last performed for the given PR, (p) customer_rel_id: a specific ID of a contact associated with the given PR, (q) entity_id: a specific ID of a company associated with the given PR, and (r) date_updated: a date and time that a given record in the PR table was last updated.

Fields Defined for a Particular Application

The following additional PR data fields are examples of additional fields that can be defined as needed): (s) category_type: a value from a "Category" pick-list, with possible selections such as: "Hardware", "Software", and "Documentation", (t) reason_opened_type: a value from a "Reason Opened" pick-list, with possible selections such as: "Service Request", "Problem Report", and "Request for Information", (u) priority_type: a value from a "Priority" pick-list, with possible selections such as: "Low", "Medium", and "High", (v) severity_type: a value from a "Severity" pick-list, with possible selections such as: "Low", "Medium", and "High", (w) exposure type: a value from an "Exposure" pick-list, with possible selections such as: "Limited", "All Customers", and "All Customers and Employees", (x) required_time: estimated time to complete the given PR, (y) required_cost: estimated time to complete the given PR.

Project Table 831

A record in Project table 831 looks like this:

```
Project(
    id                   NUMBER(12) NOT NULL,
    name                 VARCHAR2(80) NOT NULL,
    division_id          NUMBER(6) NOT NULL,
    project_type         NUMBER(6) NOT NULL,
    created_by_rel_id    NUMBER(12) NOT NULL,
    updated_by_rel_id    NUMBER(12) NOT NULL,
    date_created         DATE NOT NULL,
    date_updated         DATE NOT NULL,
    primary key(id)
)
```

Project table 831 has a record for all of the projects defined for a given database. As described above, every PR record is associated with a given Project, and thus, it can be said that all PRs in a database are "grouped" by their respective Projects. Similarly, a Project is associated with a given record in Division table 829, and thus, it can be said that all Projects in a database are further "grouped" by their respective Divisions.

This table contains the following data fields: (a) id: a unique ID in this table, (b) name: Project name, e.g., "Customer Support", "R&D Work Items", and "Assembly Line Controls", (c) division_id: a specific Division ID that a given Project is associated with; thus enabling the grouping of Projects by Divisions, (d) project_type: a value from a "Project Type" pick-list, with possible selections such as: "Manufacturing", "Administrative", and "Human Resources", (e) created_by_rel_id: a specific ID of a person who created the given Project record in this table, (f) updated_by_rel_id: a specific ID of a person that last updated the given Project record in this table, (g) date_created: date/time that the given Project record was created in this table, (h) date_updated: the date and time that this record was last updated.

Division Table 829

A division table record looks like this:

```
Division(
    id                   NUMBER(12) NOT NULL,
    name                 VARCHAR2(80) NOT NULL,
    created_by_rel_id    NUMBER(12) NOT NULL,
    updated_by_rel_id    NUMBER(12) NOT NULL,
    date_created         DATE NOT NULL,
```

-continued

```
    date_updated        DATE NOT NULL,
    primary key(id)
)
```

The Division table is a table that contains all Divisions defined for a given database. A Division is a group of Projects, and a Project is a group of PRs.

This table contains the following data fields: (a) id: a unique ID in this table, (b) name: Division name, e.g., "California Site", and "New Jersey Site", (c) created_by_rel_id: a specific ID of a person who created the given Project record in this table, (d) updated_by_rel_id: a specific ID of a person that last updated the given Project record in this table, (e) date_created: date/time that the given Project record was created in this table, (f) date_updated: the date and time that this record was last updated.

PR Activity Tables 835

PR_activity_type table 837 contains the PR activity types for the activities performed manually by users of system 801 or automatically by system 801 itself when an administrative query returns a non-empty result set. PR_activity table 839 is the collection of all activities, of either class, that were performed or are scheduled to be performed for all the processes represented by PR records in PR table 833.

PR_Activity_Type Table 837

A record in PR_activity_type table 837 looks like this:

```
PR_activity_type(
    id                  NUMBER(12) NOT NULL,
    is_admin            NUMBER(1) NOT NULL,
    name                VARCHAR2(80),
    can_schedule        NUMBER(1),
    min_members         NUMBER(2) NOT NULL,
    require_summary     NUMBER(1) NOT NULL,
    summary_prompt      VARCHAR2(120),
    can_edit            NUMBER(1) NOT NULL,
    edit_summary_only   NUMBER(1) NOT NULL,
    date_updated        DATE NOT NULL,
    primary key(id)
)
```

Each record in PR_activity_type table 837 represents a PR activity type. If the value of the is_admin field is 1, the record belongs to Admin_activity_type subtable 841 and represents an Admin activity type. The PR_activity table contains the following data fields: (a) id: a unique ID in this table, (which unique ID is referred to as pr_activity_type 609 by related tables seen in FIGS. 6 and 7), (b) is_admin, described above; (c) name: a specific name given to the PR Activity Type, e.g., "Call Customer", "Work Initiated", and "Close—Done", (d) can_schedule: if the value equals one, such a PR Activity Type can be scheduled by a user, otherwise, it can only be posted as a performed activity, (e) min_members: minimum number of activity participants that are required for the given PR Activity Type, (f) require_summary: if the value equals one, the given PR Activity Type can be performed only if an activity summary is entered, (g) can_edit: if the value equals one, a PR Activity performed using the given PR Activity Type can be edited, otherwise, it can not be edited at all, (h) edit_summary_only: if the value equals one, the summary of the PR Activity performed using the given PR Activity Type can be edited, otherwise, it can not be edited at all, and (i) date_updated: the date and time that this record was last updated.

When a record represents an Admin_activity_type, some of the fields have special values: can_schedule is not relevant, it is actually set to zero (0). Similarly, min_members=0, and require_summary and summary_prompt are set to "neutral", meaningless values. The field can_edit is set to 0, as is edit_summary_only.

PR_Activity Table 839

A record in PR_activity table 839 looks like this:

```
PR_activity(
    id                  NUMBER(12) NOT NULL,
    pr_id               NUMBER(12) NOT NULL,
    pr_activity_type    NUMBER(6),
    short_description   VARCHAR2(120),
    summary             LONG,
    date_posted         DATE NOT NULL,
    date_scheduled      DATE,
    date_performed      DATE,
    posted_by_rel_id    NUMBER(12) NOT NULL,
    updated_by_rel_id   NUMBER(12) NOT NULL,
    responsible_rel_id  NUMBER(12),
    status_origin       NUMBER(6),
    status_after        NUMBER(6),
    date_updated        DATE NOT NULL,
    primary key(id)
)
```

PR_activity table 839 is a table that contains records representing activities that are scheduled to be or have been performed for processes represented by PR records. Each record indicates the activity's PR_activity type and the PR record for the process. When a record is added to PR_activity table 839 as a result of the scheduling or performance of an activity for a process, the activity is said to have been posted. A PR activity record contains the following data fields: (a) id: a unique ID in this table. (b) pr_id: the ID of the record in PR table 833 with which this record is associated; (c) pr_activity_type: the identifier of a record in PR_activity_type table 837 that represents the activity's PR_activity type, (d) short_description: a short summary of the activity, e.g., "Called customer to clarify request", (e) summary: detailed description of the actions taken by the activity, (f) date_posted: date/time that the given record in the PR_activity table was created, (g) date_scheduled: date/time that the given PR Activity is scheduled to be performed, (h) date_performed: date/time that the given PR Activity was performed; this value is null if not yet performed, i.e., if still scheduled, (i) posted_by_rel_id: a specific ID of a person who posted the given PR Activity, (j) updated_by_rel_id: a specific ID of a person who last updated the given PR Activity, (k) responsible_rel_id: a specific ID of a person that is responsible for performing the given PR Activity, (l) status_origin: a PR status that was in effect prior to performing the given PR Activity, e.g., "Opened", (m) status_after: a PR status that went into effect after performing the given PR Activity, e.g., "Work in Progress", and (n) date_updated: the date and time that this record was last updated.

When the activity represented by a record in PR_activity table 837 is an administrative activity, posting occurs only after system 801 has performed the administrative activity. System 801 automatically sets many of the above data fields to special values when it posts the record. The date scheduled is set to null, the date_performed is the then date/time that system 801 has posted the record, and the responsible_rel_id is set with a symbolic "admin" user, as is the posted_by_rel_id. Summary is set with an indication that "this activity is an administrative activity posted due to certain conditions with regard to the PR. Also included in the summary is the PR_query.description, i.e., the value in the 'description' field of the PR_query record for the administrative query whose execution caused the administrative action to be performed.

Administrative Query Tables 845

Admin_query table 853 contains a record for each of the administrative queries, referred to as Admin Query (AQ), which system 801 can make. An administrative query has the following components:

- a query (the query is an SQL query in a preferred embodiment);
- a scope specifier for the query. The scope specifier specifies a subset of the records in PR 833 over which the query will be run;
- a schedule specifier for the query; this contains information that system 801 uses to figure out when the query is to be executed;
- an initial administrative activity specifier, which specifies an administrative activity which will be performed when a PR record which is returned by an execution of the administrative query is in the state of First Occurrence with regard to the execution of the administrative query.

An administrative query is further associated with a program sequence that specifies administrative activities that are performed for returns of the specific record in PR 833 by executions of the administrative query for which the record is in the state of Persistent Conditions with regard to the execution. The states of Persistent Conditions and First Occurrence will be described in more detail in connection with the discussion of log tables 871.

As shown in FIG. 6, the definition of each of the administrative query's components is contained in a record in another table that is referenced by the record in the Admin_query table 853; thus, the query is defined by a record in PR_query table 847, the scope by a record in AQ_scope table 849, the schedule by AQ_schedule table 851, and the initial administrative activity by the record in PR_activity_type table 837 for the initial administrative activity's Administrative activity type. One consequence of this arrangement is that queries, scopes, schedules, and Administrative activity types may be shared by any number of administrative queries, which greatly simplifies the configuration of administrative queries in system 801. Types of administrative activities which are performed when a PR record which is returned by an execution of an administrative query is in the state of Persistent Conditions with regard to that execution are specified in Program_sequence table 855. All of these tables will be described in detail in the following.

Admin_Query Table 853

A record in Admin_query table 853 looks like this:

```
Admin_query(
    id                  NUMBER(12) NOT NULL,
    pr_query_id         NUMBER(12) NOT NULL,
    aq_scope_id         NUMBER(12),
    aq_schedule_id      NUMBER(12) NOT NULL,
    pr_activity_type    NUMBER(12) NOT NULL,
    aq_priority_type    NUMBER(6) NOT NULL,
    is_active           NUMBER(4) NOT NULL,
    date_updated        DATE NOT NULL,
    primary key(id)
)
```

The Admin_query table specifies all the components of the Admin Query (AQ). This table contains the following data fields: (a) id: unique Admin Query ID, referred to as the AQ ID, (b) pr_query_id: the ID of the record for the query to be executed in PR_query 847, (c) aq_scope_id: the ID of record for the scope to be used in AQ_scope 849, (d) aq_schedule_id: the ID of the record for the schedule to be used in AQ_schedule 851, (e) pr_activity_type: the unique identifier for the initial activity's Admin activity type record in PR_activity_type table 837; (f) aq_priority_type: the Priority Group that this AQ should be executed under; the priority of the administrative query represented by this record is indicated by a value between 1 and 10 in this field; in single server systems, the priority decides the order in which a set of administrative queries that are scheduled to be executed at the same time are in fact executed; in multiple-server systems, the priority is also used to determine which servers execute which administrative queries; (g) is_active: indicates whether the given AQ is still active, i.e., should this AQ be considered for execution as scheduled, or is it a "retired" AQ, i.e. one that should no longer be executed, and (h) date_updated: the date and time that this record was last updated. It should also be noted that in other embodiments, the initial administrative activity might simply be the administrative activity specified in the first record in the query's program sequence.

PR_Query Table 847

A record in PR_query table 847 looks like this:

```
PR_query(
    id              NUMBER(12) NOT NULL,
    name            VARCHAR2(40) NOT NULL,
    sql_from        VARCHAR2(256) NOT NULL,
    sql_where       LONG NOT NULL,
    description     VARCHAR2(1024),
    date_updated    DATE NOT NULL,
    primary key(id)
)
```

Administrative queries are SQL queries. PR_query table 847 specifies the SQL FROM, WHERE, and ORDER clauses of the SQL query. This table contains the following fields of data: (a) id: unique Query ID, (b) name: given Query name, (c) sql_from: the SQL FROM clause, (d) sql_where: the SQL WHERE clause, (e) description: the description (user language) of what the Query is about, and (f) date_updated: the date and time that this record was last updated.

AQ_Scope Table 849

A record in this table looks like this:

```
AQ_scope(
    id              NUMBER(12) NOT NULL,
    name            VARCHAR2(254) NOT NULL,
    projects_ids    TEXT NOT NULL,
    date_updated    DATE NOT NULL,
    primary key(id)
)
```

A record in AQ_scope table 849 specifies a scope for an administrative query, that is, it defines a subset of the records in PR 833 over which the query is to run. In the preferred embodiment, the subset is defined by specifying selected projects defined in Project table 831. The subset is made up of all of the records in PR table 883 whose project_id fields specify records in Project table 831 for the selected projects.

This table contains the following data fields: (a) id: unique Scope ID, (b) name: given Scope name, (c) project_ids: a list of the names of all projects to be included (thus, filtering out other projects); the names are values of name fields in records in Project table 831; and (d) date_updated: the date and time that this record was last updated.

AQ_Schedule Table 851 and AQ_Schedule Detail Table 852

These tables contain information that system 801 uses to schedule the next execution of an administrative query. Beginning with AQ_schedule table 851, a record in the table has the following fields:

```
AQ_schedule(
    id              NUMBER(12) NOT NULL,
    name            VARCHAR2(254) NOT NULL,
    date_updated    DATE NOT NULL,
    primary key(id)
)
```

A record in AQ_schedule table 851 specifies a schedule for executing an administrative query. This table contains the following data fields: (a) id: unique Schedule ID, (b) name: given Schedule name, and (d) date_updated: the date and time that this record was last updated. The value of the unique identifier for the record is used to locate a record in the AQ_schedule_detail table that contains the actual information used to schedule the query.

A record in AQ_schedule_detail table 852 looks like this:

```
AQ_schedule_detail(
    id              NUMBER(12) NOT NULL,
    aq_schedule_id  NUMBER(12) NOT NULL,
    day_in_week     NUMBER(4),
    day_in_month    NUMBER(4),
    start_time      NUMBER(6),
    end_time        NUMBER(6),
    time_interval   NUMBER(12,2),
    date_updated    DATE NOT NULL,
    primary key(id)
)
```

A record in AQ_schedule_detail table 852 specifies the Schedule details for the AQ schedule represented by the record in AQ_schedule table 851 referred to by the value in the aq_schedule_id field. The schedule detail determines when an administrative query that specifies the schedule will be executed. This table contains the following data fields: (a) id: unique ID in this table, (b) aq_schedule_id: the ID of the record in AQ_schedule table 851 for the schedule that is using this Schedule Detail, (c) day_in_week: day in the week that the query is to be executed, e.g., 1=Sunday, 2=Monday, etc. (d) day_in_month: day in the month to be executed, e.g., 1=the first day in the month, 2=the second day in the month, etc., (e) start_time: the first time to execute the AQ during the given day, (f) end_time: the last time to execute the Query in the given day, (g) the time interval, specified in minutes, between consecutive Query executions, and (h) date_updated: the date and time that this record was last updated.

When an administrative query that uses the AQ_schedule detail record is executed, the information in the AQ_schedule_detail record is used to update the administrative query's record in current schedule table 823 to specify the next execution of the query. Where a time interval is specified, it is added to the time specified for the last execution of the query in the administrative query's record in current schedule table 823. The administrative query thus effectively schedules its next execution itself. One advantage of this arrangement is that the form of a record in current schedule table 823 is independent of the kind of scheduling being done; further, the table itself need have only one record for a given administrative query, regardless of the frequency with which the given administrative query is being executed or the complexity of its execution schedule.

Program_Sequence Table 855

Program_sequence table 855 specifies additional activities that can be performed for a process whose record in PR 833 has been retrieved by an execution of an administrative query with regard to which the retrieved PR record is in the state of Persistent Conditions. A record in Program_sequence table 855 looks like this:

```
Program_sequence(
    id              NUMBER(12) NOT NULL,
    admin_query_id  NUMBER(12) NOT NULL,
    sequence_number NUMBER(6) NOT NULL,
    time_interval   NUMBER(12,2),
    pr_activity_type NUMBER(12),
    program_control NUMBER(6) NOT NULL,
    date_updated    DATE NOT NULL,
    primary key(id)
)
```

There may be a number of records in Program_sequence table 855 for a given administrative query. The set of records for the given administrative query is called the administrative query's program sequence. The program sequence associated with a given administrative query specifies administrative activities that are to be executed with regard to a PR record that is in a state of Persistent Conditions with regard to the current execution of the administrative query. The set of records specifies not only the administrative activities, but also the order in which they are performed by executions of the administrative query for which the PR record is in the state of Persistent Conditions, and the temporal conditions under which they are to be executed. The parts of a program sequence record that specify these things are termed instruction elements, and taken together, the instruction elements in a program sequence record define an instruction. In the preferred embodiment, each record in Program_sequence table 855 specifies a set of three instruction elements: a Type instruction element, an Admin Activity Type instruction element, and an Elapsed Time instruction element. The Type instruction element specifies the Program sequence record that will be used the next time the query with which the program sequence record is associated is executed; the Admin Activity Type instruction element specifies the Administrative activity type of the activity to be performed and is thus a pr_activity_type field 609 referencing Admin_activity_type subtable 841; the Elapsed Time instruction element specifies a minimum time from the time the last administrative activity was executed by the query for a given PR record to the time the administrative activity specified by this Program_sequence record is to be executed. Other embodiments may have different instruction elements and more or fewer of them.

A record in Program_sequence table 855 contains the following data fields: (a) id: unique Program Sequence record ID, (b) admin_query_id: the id of the record in Admin_query 853 for the query that this record is associated with, (c) sequence_number: the sequence number for the record in the program sequence for the administrative query specified by the value of admin_query_id; (d) time_interval: the Elapsed Time instruction element, (e) pr_activity_type: the Admin activity type of the activity to be performed; this field is the Admin Activity Type instruction element; (f) program_control: the Type Instruction Element; this field may have values from the group of: (f1) Stop, (f2) Next, or (f3) Continue, where Stop means ceasing to execute any further administrative activities for a given PR record while the given PR record is in the state of Persistent Conditions with regard to an execution of the Admin Query, Next means using the next program sequence record in the query's program sequence the next time the query is executed, returns the given PR record, and the given PR record is in the state of Persistent Conditions with regard to the execution, and Continue means again executing the present program sequence record the next time the query is executed returns the given PR record, and the given PR record is in the state of Persistent Conditions with regard to the execution, and (g) date_updated: the date and time that this record was last updated. It should be noted that in other embodiments, the Type instruction element may be able to specify any program sequence record in the query's program sequence, i.e., the Type instruction element may function as a "goto" or include a conditional branch.

The Elapsed Time Instruction element specifies the minimum elapsed time from the previous time that an administrative activity was performed for a given administrative query and a given PR record to the time when the administrative activity specified in the current record in the Program_sequence table 855 should next be executed. More specifically, if a PR record is in the state of Persistent Conditions when the given administrative query is executed again, but the time elapsed from the last action taken to the current time is less than the specified Elapsed Time, then the administrative activity specified in the current program sequence record will not be performed and the current value of the Next Sequence Pointer will remain unchanged. As a result, the same record in the Program Sequence Table will be considered again if the state of Persistent Conditions still exists for the given PR record on the next execution of the given AQ that returns the given PR record.

Example of a Program Sequence and its Execution

An example of a program sequence associated with an administrative query "All Past Due Items" that returns PR records 833 with items that have passed their deadlines without action being taken is the following:

Program sequence record for the "All Past Due Items" query with sequence_number=1:
  Type="Next";
  Elapsed Time=30 minutes; and
  Administrative activity type to be Executed="Send email notification and escalate priority"
Program sequence record for the "All Past Due Items" query with sequence_number=2:
  Type="Continue";
  Elapsed Time=24 hours; and
  Administrative activity type to be Executed="Notify management"

According to this example, if the AQ "All Past Due Items" is scheduled for execution every day and once every hour of the day, and if PR record #1012 was first included in the Result Set (the set of records returned by the query) at 10:00 AM on a given day, then the Initial administrative activity specified in the query will be executed with regard to PR record #1012 and a Next Sequence Pointer in the record for the query and PR record in AQ_PR_log 875 will be set to the numeric value of one. Thereafter, if this PR is in the state of Persistent Conditions (as determined from records for the query and PR record in Admin_query_log 873 and AQ_PR_ log 875) at 11:00 AM, system 801 will retrieve the record in the query's program sequence in which sequence_number=1, and since the specified Elapsed Time is 30 minutes and the actual elapsed time from the previous execution is one hour, the condition of the Elapsed Time will have been satisfied and system 801 will execute the Administrative activity type specified by the value of the record's pr_activity_type and will increment the Next Sequence Pointer by one, so that it points to the second program sequence record in the program sequence.

When system 801 next executes the administrative query associated with the program sequence at 12:00 PM, if PR #1012 is still part of the result set and PR #1012 is in the state of Persistent Conditions, system 801 will follow Next Sequence Pointer to the second record in the program sequence for the administrative query. However, since the Elapsed Time specified for this sequence record is 24 hours, and since the actual elapsed time from the previous execution is only one hour, the condition of Elapsed Time of 24 hours will not be satisfied and therefore the administrative activity for this sequence record will not be performed. Since the administrative activity was not performed, the Next Sequence Pointer will not be incremented. The specified administrative action will only be performed if PR #1012 continues to be in the state of Persistent Conditions throughout the next 23 hours, and it will not be until system 801 executes the "All Past Due Items" AQ the next day at 11:00 AM that the "Elapsed Time" Instruction Element of 24 hours will be satisfied, at which time system 801 will perform the administrative action of the type "Notify Management" specified for the second record in the program sequence. Having performed the administrative action, system 801 will perform the operation specified by Type on the Next Sequence Pointer. Type specifies "Continue", and consequently, system 801 will not change the value of the Next Sequence Pointer. Therefore, as long as PR #1012 stays "Past Due", management will continue to be notified every day at 11:00 AM that PR #1012 is in such a state. The above example shows how detection of the state of Persistent Conditions and an administrative query's program sequence can be used to enable system 801 to check the status of a process with a high degree of frequency without generating notifications on every status check.

It should be pointed out here that, seen in general terms, an administrative query's program sequence defines a set of behaviors that correspond to a set of substates that a PR record may be in when the PR record is in the state of Persistent Conditions with regard to an execution of an administrative query. In the preferred embodiment, information about what substate a given PR record is presently in is preserved between executions of the query in the Next Sequence Pointer in the record for the query and the given PR record in AQ_PR_ log 875 In other embodiments, the substate information may be preserved between executions of the query in other forms.

Details of Log Tables 871

Admin_query_log table 873 and AQ_PR_log 875 together contain the information that system 801 uses to determine when to perform the next administrative activity for a PR record returned by an execution of a given administrative query and what administrative activity the next administrative activity should be.

Admin_Query_Log 873

A record in this table looks like this:

```
Admin_query_log(
    id                  NUMBER(12) NOT NULL,
    aq_scope_id         NUMBER(12),
    admin_query_id      NUMBER(12) NOT NULL,
    pr_query_id         NUMBER(12) NOT NULL,
    host_name           VARCHAR2(254),
    datetime_executed   DATE NOT NULL,
    pr_count_matched    NUMBER(12),
    pr_count_executed   NUMBER(12),
    date_updated        DATE NOT NULL
)
```

Admin_query_log table 873 logs the execution of every administrative query by system 801. There is a record for every execution of each of the administrative queries. Records in the table contain the following data fields: (a) id: unique AQ Log ID, b) aq_scope_id: the ID of the record in AQ_scope table 849 for the scope of the execution of the administrative query represented by the record; (c) admin_query_id: the ID of the record in Admin_query table 853 for the administrative query whose execution is represented by the Admin_query_log record; (d) pr_query_id: the ID of the record in PR_query 847 that defines the query used in the execution represented by the record; (e) host_name: which server this AQ executed on in the execution represented by the record, (f) datetime_executed: the date and time of the execution represented by the record; this field is set after system 801 has performed any necessary administrative actions on all of the PR records in the result set returned by the administrative query; this value is further one of the values used to determine whether Persistent Conditions exist with regard to the current execution of the administrative query and a particular PR record returned by the execution; (g) pr_count_matched: the count of PRs that matched given Query (set of conditions) in the execution represented by the record; (h) pr_count_executed: the count of PRs for which an administrative action was performed during the execution represented by the record, and (i) date_updated: the date and time that this record was last updated.

AQ_PR_Log Table 875

This table has a record corresponding to each PR record returned by a given execution of an administrative query. This record further contains the Next Sequence Pointer that determines which Administrative activity type will next be executed by system 801 for the given query and PR record.

```
AQ_PR_log(
    id                  NUMBER(12) NOT NULL,
    admin_query_id      NUMBER(12) NOT NULL,
    pr_id               NUMBER(12) NOT NULL,
    date_aq_executed    DATE,
    date_aa_executed    DATE,
    pr_activity_type    NUMBER(12) NOT NULL,
    next_sequence       NUMBER(6),
    date_updated        DATE NOT NULL
)
```

AQ_PR_log table 875 logs PR records that were returned when a given administrative query was executed. Each record represents a particular PR record-administrative query execution pair. A record contains the following data fields: (a) id: unique id of the record in the table, (b) admin_query_id: the ID of the particular administrative query that was executed, (c) pr_id: an identifier for the PR record that was returned when the given administrative query was executed; (d) date_aq_executed: the date and time of the particular execution of the administrative query; this value is equal to the value of the datetime_executed field in the Admin_query_log table record for the same particular execution of the administrative query; (e) date_aa_executed: the date and time that the last administrative action was performed for the administrative query and PR record; (f) pr_activity_type: the Administrative activity type for the most recently performed administrative activity; (g) next_sequence: the value of the Next Sequence Pointer, and (h) date_updated: the date and time that this record was last updated.

Using AQ_PR_Log Table 875 and Admin_Query_Log 873 to Determine Whether a Process Represented by a PR Record is in a State of Persistent Conditions or a State of First Occurrence A given PR record is in a state of Persistent Conditions with regard to an execution of a given administrative query that returns the given PR record if the immediately preceding execution of the given administrative query also returned the given PR record. This of course means that the process condition which the given administrative query is intended to monitor is persisting with regard to the given PR record. If the given PR record is not in a state of Persistent Conditions, it is in a state of First Occurrence.

When system 801 executes the given administrative query, the execution returns the given PR record, and the given PR record is in a state of First Occurrence with regard to the execution, system 801 performs the initial administrative action specified for the given administrative query. When the given PR record is in a state of Persistent Conditions with regard to the execution, system 801 performs the administrative action specified in the Program_sequence table record for the given administrative query that is pointed to by the current value of the Next Sequence Pointer.

A preferred embodiment of system 801 detects the existence of a state of Persistent Conditions or a state of First Occurrence for a given execution of an administrative query and a given PR record returned by that execution from the information about executions of the given administrative query that is contained in Admin_query_log table 873 and the information about executions of the given administrative query and the PR records they returned that is contained in AQ_PR_log table 875. The state of Persistent Conditions is detected as follows: when system 801 is executing a given administrative query and the administrative query returns a result set that includes a given PR record, system 801 searches in AQ_PR_log record for a record that matches the given PR record and given administrative query. If such a record is found, system 801 compares the value of the date_aq_executed field in the AQ_PR log record with the value of the datetime_executed field of the most recent Admin_query_log record for the given administrative query. There are three possible outcomes:

1. There may be no AQ_PR_log record at all for the given PR record and the given administrative query; if that is the case, this is the first time the given PR record has been part of the result set returned by the given administrative query and the given PR record is in a state of First Occurrence for this execution of the given administrative query.
2. There is an AQ_PR_log record for the given PR record and the given administrative query, but the value in the date_aq_executed field is less recent than the value in the datetime_executed field in the most recent Admin_query_log record for the given query, indicating that the immediately preceding execution of the given query did not return the given PR record in its result set and that the given PR record is therefore not in the state of Persistent Conditions; thus the given PR record will again be in the state of First Occurrence for this execution of the given administrative query.

3. There is an AQ_PR_log record for the given PR record and the given administrative query, and the value in the date_aq_executed field is equal to the value in the datetime_executed field in the most recent Admin_query_log record for the given query, indicating that the immediately preceding execution of the given query did return the given PR record in its result set; thus the given PR record is in the state of Persistent Conditions for this execution of the given administrative query.

A scenario that will produce outcome (2) above is the following: an administrative query called "Find overdue PR records" returns all PR records where the value of the is_closed field is zero, indicating that the record is still open, and the value in the date_due field is less recent than the time of the current execution of the administrative query. The administrative query is run every hour. PR record #120, has a date_due field that specifies 11:30. When the administrative query is run at 12:00, it returns PR record #120. Then, at 12:30, the person responsible for the process extends the deadline by setting the date_due field in record #120 to 1:30. When the administrative query is run at 1:00, it does not return PR record #120. The 1:30 deadline is also not met, and when the administrative query is run at 2:00, it again returns PR record #120; however, since the administrative query returned PR record #120 at 2:00 but did not return it at 1:00, PR record #120 is not in the state of Persistent Conditions with regard to the "Find overdue PR records" administrative query at 2:00, but is instead again in the state of First Occurrence.

AQ_Trends Table 879

As shown in FIG. 8, this table properly belongs to administrative queries tables 845. AQ_trends table 879 logs information which system 801 can use to determine trends in the way in which the processes being monitored by a given administrative query are behaving and to perform administrative actions as determined by those trends.

There may be a record in this table for every administrative query for which trends are being tracked. The record for a given administrative query can be configured to recognize trends over a particular time interval in the number of PR records returned by executions of the given administration query and to specify administrative activities for particular trends. When a particular threshold is reached and detected during an execution of the administrative query, the execution of the administrative query may result in the performance of an administrative action on a particular PR record that is separate from the PR records returned by the administrative query. The interaction between the record for an administrative query in the AQ_trends table and executions of the administrative query is another example of conditional performance of an administrative action based on a condition that is detected during execution of the query.

One administrative activity specified in the AQ_trends table record may set a field in the separate PR record indicating that the threshold for a trend in one direction has been exceeded, and another may reset that field if a trend is below the given threshold. The determination of "exceeding" the threshold or going "below" a given threshold is dependent on a direction qualifier. Another administrative query may query PR records set by these administrative activities and when one of these records is in a state of Persistent Conditions over time, indicating that a trend is continuing, an execution of the other administrative query may result in performance of an administrative activity that notifies someone or takes some other action to remedy the trend.

A record in AQ_trends table 879 has the form:

```
AQ_trends(
    id                  NUMBER(12) NOT NULL,
    admin_query_id      NUMBER(12) NOT NULL,
    time_interval       NUMBER(12,2) NOT NULL,
    direction_type      NUMBER(2) NOT NULL,
    percentage_set      NUMBER(12,4),
    percentage_reset    NUMBER(12,4),
    pr_id               NUMBER(12) NOT NULL,
    aa_post_on_set      NUMBER(12),
    aa_post_on_reset    NUMBER(12),
    date_updated        DATE NOT NULL
)
```

A record in AQ_trends table 879 can be configured to respond to trends visible in the executions of the administrative query associated with the record, based on the number of PR records that match given administrative query, as reflected in the values of the 'pr_count_matched' field in the query's Admin_query_log table 873, and the behavior of the values of that field over time. This table contains the following data fields: (a) id: unique ID in this table, (b) admin_query_id: the ID of the specific administrative query, which the given record is configured for, (c) time_interval: a specific time interval, across which a trend is calculated, e.g., 24 hours, (d) direction_type: an indicator for whether a watch is on an increase in 'pr_count_matched', or a decrease in same, (e) percentage_set: is a threshold, which when exceeded, will cause system 801 to perform a "set" administrative activity during execution of the administrative query on a PR record; (f) percentage_reset: is a threshold, below which the same is done with a "reset" administrative activity; (g) pr_id: a unique identifier for the PR record which will be operated on by the set and reset administrative activities, (h) aa_post_on_set: an identifier for the record in Admin_activity_type table 841 for the set administrative activity's administrative activity type; (i) aa_post_on_reset: the same for the reset administrative activity, and (j) date_updated: the date and time that this record was last updated.

Details of Action Tables 857

The actions performed by system 801 when it executes a given Administrative activity type are described in records in action tables 857 whose pr_activity_type fields contain the unique identifier of the given Administrative activity type's record in PR_activity type table 837. There are a number of kinds of actions, and each kind has its own table in action tables 857. If an Administrative activity type is seen as a kind of program, the actions associated with a given Administrative activity type can be seen as the Administrative activity type's instructions. As with normal program instructions, the action performed by a given program instruction may depend on a value that is obtained at runtime. When the actions belonging to a given administrative activity are executed, they are executed in the order given by the values of the action records' identifiers. In other embodiments, there may be other provisions for establishing an order in which the actions are executed and there also may be provisions for gotos and conditional branches. An important aspect of the present invention is the ability to easily modify pre-existing Administrative activity types. To modify an administrative activity type, one needs only modify the records in action tables 857 for the actions belonging to the administrative activity type, either by adding or deleting records or editing existing records. Modification of an administrative activity is not only easy, but safe, since the modifications are constrained by the fields available in the action records being added, deleted, or edited.

In a preferred embodiment, there are three broad classes of actions: those which modify a PR record which belongs to the result set returned by an administrative query; those which post records for activities to the PR_activity table, and one action which generates a report about the PR records in the result set returned by the administrative query. The relationship between these classes of actions and the kinds of actions are as follows:

Kinds of actions which modify PR records:
  AA_set_values actions in table 859: these actions set or increment fields in PR records that contain neither person nor date values.
  AA_set_person actions in table 863: these actions set fields in PR records that contain person values. A person value is an identifier for a person known to system 801.
  AA_set_dates actions in table 861: these actions set fields in PR records that contain date values. The date fields are set with reference to other date fields in the PR records or with reference to the date and time when an administrative activity is performed.

Kinds of actions which post records in PR_activity table 839:
  AA_post_activities actions in table 865: these actions post records for any kind of activity type in PR_activity table 839. The posting may either schedule an activity for performance or indicate that the activity has been performed.
  PR_notification actions in table 865: these actions generate and send a notification to a list of people that is associated with the process's PR record, post a record to PR_activity table 839 for the notification, and makes a record in another table (not shown) which indicates who received notifications.

Report generating actions:
  AA_exec_report actions in table 865: generates a report which includes all the PR records of the result set returned by the administrative query that is performing the administrative activity that contains the action, formats the report based on a specified report template, converts its to a PDF file, and mails out the PDF file as an attachment to recipients based on a configurable recipient list.

An action table record associated with a given Administrative type may come from any of the action tables and an Administrative type may have any number of action table records associated with it. To clarify by example, for a given Administrative activity type, system 801 can be configured to have no records in AA_set_values actions table 859, which means that upon performing this given Administrative activity type, there will be no effect on any non-date or any non-person field values in the matching PR records; one record in the AA_set_person actions table 863, indicating one specific person field to be affected; and three records in AA_set_dates actions table 861, indicating three specific date or date-time fields to be affected by this given Administrative activity type. The same is true for the other kinds of actions.

It should be pointed out here that in general, the kinds of actions defined for an embodiment of the invention will depend on the kind of process being controlled by the invention. The kinds of actions in the preferred embodiment are typical for embodiments that are intended to control business and administrative processes. Embodiments that are intended to control industrial or technical processes may have actions that result in physical actions being performed. Examples might be sounding an alarm, adjusting a valve, or rerouting a stream of packets. The details of the action tables are presented in the order of the above taxonomy.

AA_Set_Values Table 859

The actions represented by the records in this table affect values in PR records returned by the administrative query that performs an administrative activity which includes the record's action.

Records in this table have the following form:

```
AA_set_values (
    id                  NUMBER(12) NOT NULL,
    pr_activity_type    NUMBER(12) NOT NULL,
    data_field_id       NUMBER(12) NOT NULL,
    action_type         NUMBER(6) NOT NULL,
    set_type_id         NUMBER(12) NOT NULL,
    date_updated        DATE NOT NULL
)
```

Records in AA_set_values table 859 contain the following data fields: (a) id: unique ID of the record in this table, b) pr_activity_type: the ID of a record in table 837 for a specific administrative activity type to which the action belongs; (c) data_field_id: a value that specifies what field is to be affected by the action in the PR records of the result set returned by the query execution that is performing the administrative activity. There is a value of data_field_id associated with each of the fields that is defined for a PR record, (d) action_type: action to be taken: incrementing the current value of the field specified by the value of data_field_id, or setting that field to a predetermined value, (e) set_type_id: a value to be used in setting the specified field; when action_type specifies increment, the value of set_type_id is the value by which the value in the field specified by data_field_id is to be incremented (or decremented); otherwise, it is a constant value to which the field is to be set, and (f) date_updated: the date and time that this record was last updated.

AA_Set_Person Table 863

The actions represented by the records in this table affect person values in PR records returned by the administrative query that performs an administrative activity which includes the record's action.

Records in this table have the following form:

```
AA_set_person(
    id                  NUMBER(12) NOT NULL,
    pr_activity_type    NUMBER(12) NOT NULL,
    data_field_id       NUMBER(12) NOT NULL,
    person_role_type    NUMBER(12) NOT NULL,
    person_rel_id       NUMBER(12) NOT NULL,
    date_updated        DATE NOT NULL
)
```

Records in this table contain the following data fields: (a) id: unique ID of the record in this table, (b) pr_activity_type: the ID of the record in PR_activity_type table 837 of the Administrative activity type to which this action belongs; (c) data_field_id: an identifier for the field in the PR record that is to be affected by the action, (d) person_rel_id: if not null, the value to be assigned to the field specified by data_field_id; this value is an identifier for a specific person, (e) person_role_type: if not null, a value for a role that is to be assigned to the affected field; in this case, system 801 will select an ID of a person from a circular list of persons with the given role. System 801 remembers the last person selected from the list in conjunction with performance of an activity of the given Administrative activity type, so that on the next occurrence of such an activity, system 801 will select the next person on the given list; and (f) date_updated: the date and time that this record was last updated.

AA_Set_Dates Table 861

The actions represented by the records in this table affect date or date and time values in PR records returned by the administrative query that performs an administrative activity which includes the record's action.

Records in this table have the following form:

```
AA_set_dates(
    id                    NUMBER(12) NOT NULL,
    pr_activity_type      NUMBER(12) NOT NULL,
    data_field_id         NUMBER(12) NOT NULL,
    data_field_not_set    NUMBER(12),
    not_set_add_value     NUMBER(12),
    data_field_if_set     NUMBER(12),
    set_add_value         NUMBER(12),
    business_days_rule    NUMBER(2),
    date_updated          DATE NOT NULL
)
```

Records in this table contain the following data fields: (a) id: unique ID in this table, (b) pr_activity_type: the ID of the record in PR_activity_type table 837 that represents the administrative activity type that the action represented by the record belongs to; (c) data_field_id: an identifier for a date or date/time field in the PR record which is to be affected by the change, hereinafter the "affected field"; (d) data_field_not_set: an identifier for a field in the PR record whose value specifies a date or date/time type field; the field's value is used as a reference value when the current value of the affected field is null, (e) not_set_add_value: a numeric value to be added to the reference value of the when the affected field is null; the affected field is set to the result of the addition; (f) data_field_if_set: an identifier for a field in the PR record whose value specifies a date or date/time type field; the field's value is used as a reference value when the current value of the affected field is not null, (e) set_add_value: a numeric value to be added to the reference value when the affected field is non-null; the affected field is set to the result of the addition; (h) business_days_rule: a code specifying whether the value of the not_set_add_value or the set_add_value field represents business days or calendar days; and (i) date_updated: the date and time that this record was last updated. Note 1: 'not_set_add_value' and 'set_add_value' may be positive, negative, or zero and may also specify fractions of days. Note 2: if a reference field id equals a given constant, e.g., −1, this indicates to system 801 to not use any specific date or date/time field, but rather, the date/time of when the given administrative activity is executed, i.e., the then current time.

AA_Post_Activities Table 865

Records in AA_post_activities table 865 represent actions that post records in PR_activity table 839 for non-administrative activities. The action may post the activity as either having been performed or scheduled to be performed.

Records in this table have the following form:

```
AA_post_activities(
    Id                    NUMBER(12) NOT NULL,
    pr_activity_type      NUMBER(12) NOT NULL,
    post_activity_type    NUMBER(12) NOT NULL,
    posting_mode          NUMBER(2) NOT NULL,
    data_field_date       NUMBER(12),
    add_value             NUMBER(12),
    business_days_rule    NUMBER(2),
    data_field_person     NUMBER(12),
    responsible_rel_id    NUMBER(12),
    date_updated          DATE NOT NULL
)
```

Records in AA_post_activities contain the following data fields: (a) id: unique ID of the record in this table, (b) pr_activity_type: the ID of the record in PR_activity_type table 837 that represents the administrative activity type that the action represented by the record belongs to; (c) post_activity_type: the ID of the record in PR_activity_type table 837 that represents the activity type of the non-administrative activity being posted in PR_activity table 839; (d) posting_mode: a code specifying whether the non-administrative activity should be posted as a scheduled activity or as a performed activity, (e) data_field_date: an identifier for a field in the PR record whose value specifies a date or date/time type field; the field's value is used as a reference value to compute a date or date/time at which the non-administrative activity is to be scheduled for performance if the value of posting_mode indicates that the non-administrative activity should be scheduled, rather than performed right away; (f) add_value: a numeric value to be added to the reference value in the case where posting_mode indicates that the given activity should be posted as scheduled; the result of this addition will be used to set the date_scheduled field of the given PR Activity record; (g) business_days_rule: a code specifying whether the value of the add_value field represents business days or calendar days; (h) data_field_person: an identifier of a person type data field in the PR record the administrative activity is being performed on whose value is to be used to indicate the person responsible in the PR_activity record being posted; (i) responsible_rel_id: the value of this field is an identifier for a person who is the person responsible for the given PR Activity; the value will be used in the responsible_rel_id field of the PR_activity record being posted; (j) date_updated: the date and time that this record was last updated. Note 1: the value of 'add_value' is specified using any desired day or fraction of a day units. Note 2: the specifiers 'data_field_person' and 'responsible_rel_id' are mutually exclusive. Note 3: When posting a PR_activity record as a performed activity, system 801 sets the date_performed field of the PR_activity record to the date/time that said activity was posted by the system, yet leaves the date scheduled field null, whereas when posting an activity as a scheduled activity, system 801 sets the date scheduled field of the activity as explained above, yet leaves the date performed field null.

PR_Notification Table 867

The actions represented in the records of this table generate a record in PR_activity type table 837 for a notification activity that sends a notification to a list of people that are associated with the process's PR record, posts a record to PR_activity table 839 for the notification activity, and makes a record in another table that keeps track of who received notifications.

Records in table 867 have the following form:

```
PR_notification(
    id                  NUMBER(12) NOT NULL,
    project_id          NUMBER(12) NOT NULL,
    pr_activity_type    NUMBER(6) NOT NULL,
    trigger_type        NUMBER(6) NOT NULL,
    pr_owner            NUMBER(1) NOT NULL,
    customer            NUMBER(1) NOT NULL,
    originator          NUMBER(1) NOT NULL,
    reporting_to        NUMBER(1) NOT NULL,
    activity_members    NUMBER(1) NOT NULL,
    date_updated        DATE NOT NULL,
    primary key(id)
)
```

Records in this table contain the following data fields: (a) id: a unique ID in this table, (b) project_id: a specific Project ID, as notifications may be configured differently in different projects, (c) pr_activity_type: the ID of the record in PR_activity_type table 837 that represents the administrative activity type that the action represented by the record belongs to; (d) trigger_type: an indicator of when notification should be triggered, e.g., when the notification activity is posted as a scheduled activity to the PR_activity table 839 or when it is actually performed; (e) pr_owner: if the value equals one, the PR owner, i.e., the Assigned To person, should be notified, (f) customer: if the value equals one, the PR main contact should be notified, (g) originator: if the value equals one, the PR originator, e.g., the requester, should be notified; (h) reporting_to: if the value equals one, the manager of the Assigned To person should be notified, (i) activity_members: if the value equals one, all members of the given activity should be notified; all of these persons are identified in a record associated with the PR record for which the activity is executed; and (j) date_updated: the date and time that this record was last updated.

AA_Exec_Report Table 869

The actions represented by the records in this table generates a report concerning the PR records of the result set returned by the query which performs the activity to which the action belongs.

Records in table 869 have the following form:

```
AA_exec_report(
    id                  NUMBER(12) NOT NULL,
    pr_activity_type    NUMBER(12) NOT NULL,
    report_template_id  NUMBER(12) NOT NULL,
    filename_path       VARCHAR2(254),
    date_updated        DATE NOT NULL
)
```

The records in AA_exec_report table 869 represent actions that generate reports. A report is generated using a configured report template and includes all the PR records that were matched by the administrative query that resulted in the performance of the activity the action belongs to. The AA_exec_report table 869 contains the following data fields: (a) id: unique ID in this table, (b) pr_activity_type: the ID of the record in PR_activity_type table 837 that represents the administrative activity type that the action represented by the record belongs to; (c) report_template_id: the id of a template for the report to be generated by the action; (d) filename_path: a complete filename and path specifying where the report should be saved—this is not a mandatory field, and if not specified, the report will be generated as a temporary file—either the specified file or the temporary file is then sent electronically as an attachment to a specified list of recipients; and (e) date_updated: the date and time that this record was last updated. The list of recipients is in another table; the record for each recipient has a pr_activity_type value that specifies the record for the administrative activity type that the action represented by the AA_exec_report record belongs to.

Details of the Operation of System 801: FIGS. 1-4

Figure 1:
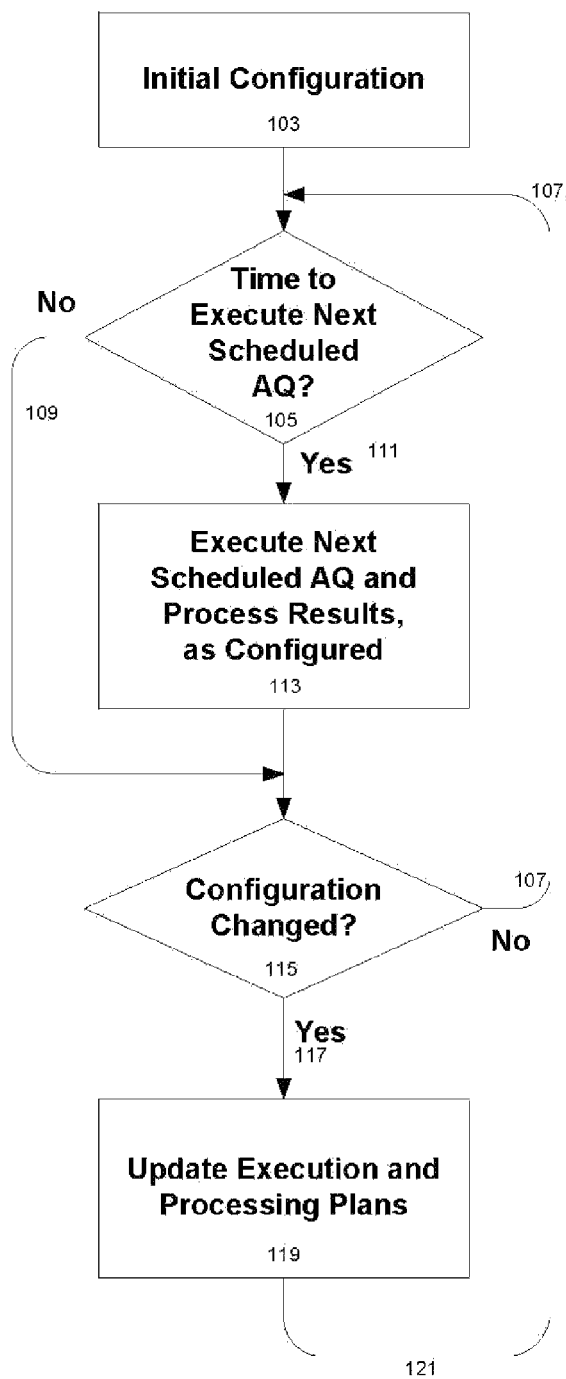
FIG. 1 shows a flowchart depicting the steps by which an exemplary embodiment of the present invention operates.

Overview of Operation: FIG. 1.

FIG. 1 is a high-level flowchart 101 of the operation of system 801. The first step (103) is configuring the system. The configuration process begins after a process that is to be monitored by system 801 has been designed. First, the persons doing the configuration design a PR record for the process, with the particular fields required to monitor the process. Once this is done, the persons doing the configuration can configure the administrative queries that will do the actual monitoring. The administrative queries are configured by making or selecting records in administrative query tables 845 for the entire query (in Admin_query 853), for the SQL for the query (in PR_query 847), for the scope of the query (in AQ_scope 849), for the schedule for executing the query (in AQ_schedule_detail 852), and for the administrative activities to be executed by the query (in PR_activity_type 837). The actions for each administrative activity must further be defined in records in action tables 857. The PR_activity_type record for the initial administrative action for the query is specified in the query's record in Admin_query 853; this activity is performed whenever a PR record returned by the query is in the state of First Occurrence. PR_activity_type records for the activities that are performed when a PR record returned by the query is in the state of Persistent Conditions are specified in a program sequence for the query of Program_sequence records in table 855. It is an important advantage of system 801 that a query may be configured using records in PR_query table 847, AQ_scope table 849, AQ_schedule table 851, and Admin_activity_type table 841 that were created for other queries. This feature permits work that was previously done to configure another query to be reused in configuring a new query.

Once the process has been designed and records in the tables in DB system 825 have been properly configured, system 801 can begin executing administrative queries for the process. System 801 loads all the configuration information from administrative query tables 845, and Action tables 857 to construct current schedule table 823 and current query and processing plans table 824 in memory 809 of computer 803 in system 801; then selects the next administrative query to be executed from the current schedule table 823. Each time an administrative query is executed, system 801 uses the information for scheduling stored in current schedule table 823 for the query to specify the time of the query's next execution; each time this is done, system 801 finds the record in schedule table 823 that has the shortest time remaining until execution and executes the query when that time has expired, as shown in step 105.

If there is no query to be executed at the present time, system 801 takes branch 109 and checks whether any changes have been made in the configuration tables that define the processes and queries in DB system 825, namely: administrative query tables 845 and Action tables 857 (step 115); if there are no changes in the configuration, branch 107 is taken back to decision block 105; if there are any changes, branch 117 is taken and the updated configuration from the configuration tables in DB system 825 is fetched and the current schedule table 823 and the current query and processing plans table 824 are modified as required for such changes (step 119), and when that is done, system 801 returns to decision block 105 and again checks whether it is time to execute the next scheduled administrative query (loop 121).

If there is a query to be executed, system 801 executes the administrative query as it has been configured in tables 845 (block 113), as reflected in the current query and processing plans table 824: the query specified in the administrative query's PR_query record is executed on the PR records belonging to the scope specified in the query's AQ_scope record, and the activities specified in the administrative query itself and in its program sequence in Program_sequence 855 are performed. The activity performed for a given PR record in the result set returned by an execution of an administrative query will depend on the record's state with regard to that execution; depending on the action records that belong to an administrative activity's Administrative activity type, performance of the administrative activity may modify the PR record, may post an activity in PR_activity table 839, may notify interested parties of something that has taken place in the process, may generate a report about the result set returned by the query, or may take action based on trends. When all of this is finished, system 801 updates the current schedule table 823 for the query just executed, setting the time for when this query will be executed next. Before executing the next query, 801 checks whether the configuration has changed (decision block 115); the possible results of such a check have already been described.

Figure 2:
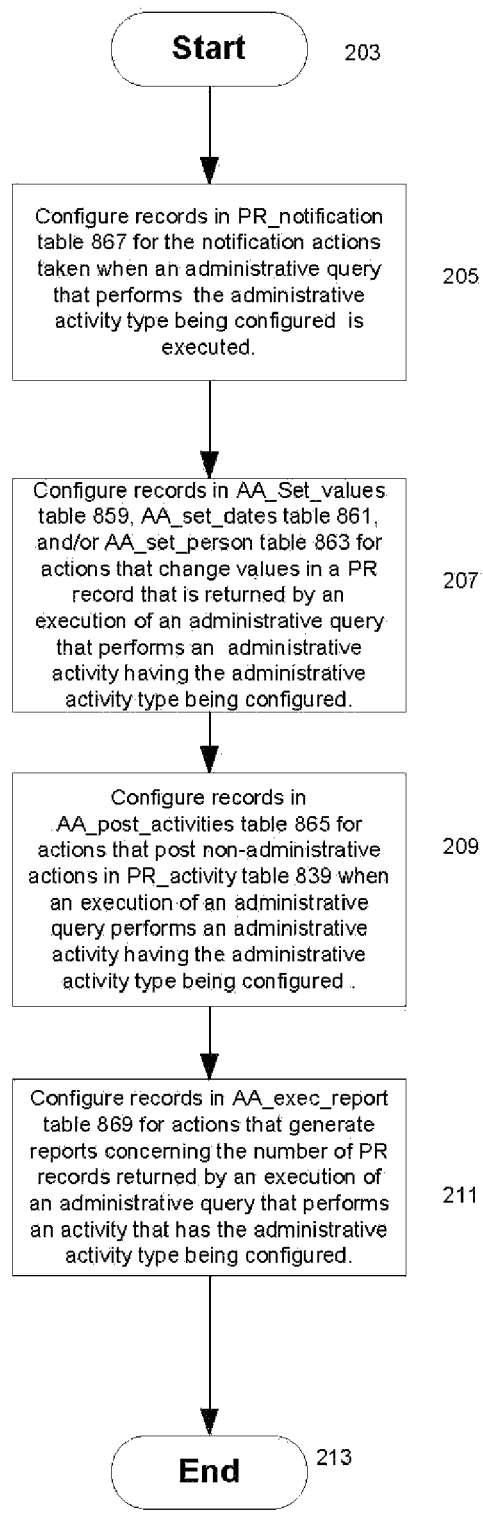
FIG. 2 shows a flowchart depicting how administrative activities are configured in an exemplary embodiment of the present invention.

Details of Configuring Administrative Activity Types: FIG. 2

An administrative activity type is configured by associating one or more actions defined in action tables 857 with the administrative activity type. In flowchart 201, the kinds of actions are represented by blocks in the flowchart. With regard to a given administrative activity type, there may be any number of actions associated with the given administrative activity type, the actions may be of any kind, and they may be configured in any order. An action defined by a given record in action tables 857 may, however, be associated with only a single administrative activity type.

Beginning with block 205, that block represents the configuration of notification actions represented by records in PR_notification table 867; block 207 represents the configuration of actions that set values in PR records; these actions are represented by records in AA_set_values table 859, AA_set_dates table 861, and AA_set_person table 863. Block 209 represents the configuration of post activity actions represented by records in AA_post_activities table 865; Block 211, finally, represents actions represented by records in AA_exec_report 869.

Figure 3:
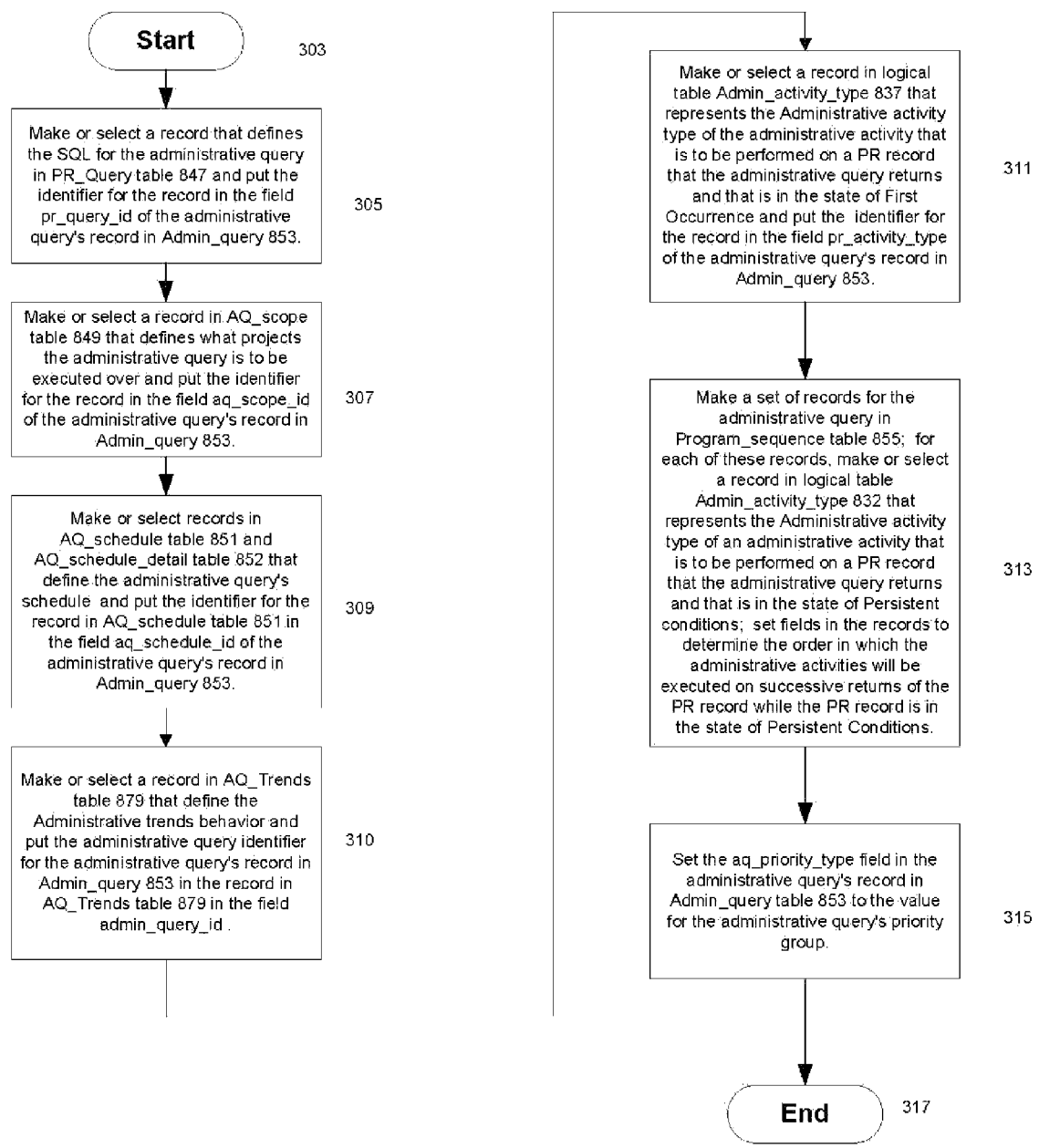
FIG. 3 shows a flowchart depicting how administrative queries are configured in an exemplary embodiment of the present invention.

Details of Configuring Administrative Queries: FIG. 3

An administrative query is configured by associating an SQL query, a scope, a schedule, an Administrative activity type for the initial activity, a program sequence of Administrative activity types, a record in AQ_trends table 879, and a priority with the administrative query. Previously existing SQL queries, scopes, schedules, and Administrative activity types may be reused in the configuration; the program sequence and the record in AQ_trends table 879 must be defined for the particular administrative query being configured. Flowchart 301 shows these operations; they may be performed in any order.

Beginning with block 305, that block sets forth the association of the SQL query with the administrative query; block 307 sets forth the association of the projects that define the administrative query's scope with the administrative query; block 309 sets forth the association of a schedule of execution with the query; block 310 sets forth the association of a record in AQ_trends table 879 with the administrative query; block 311 sets forth the association of the Administrative activity type for the query's initial administrative activity with the query; block 313 sets forth the association of a program sequence in Program_sequence table 855 with the query; block 315 sets forth the assignment of the query to a priority group.

Figure 4:
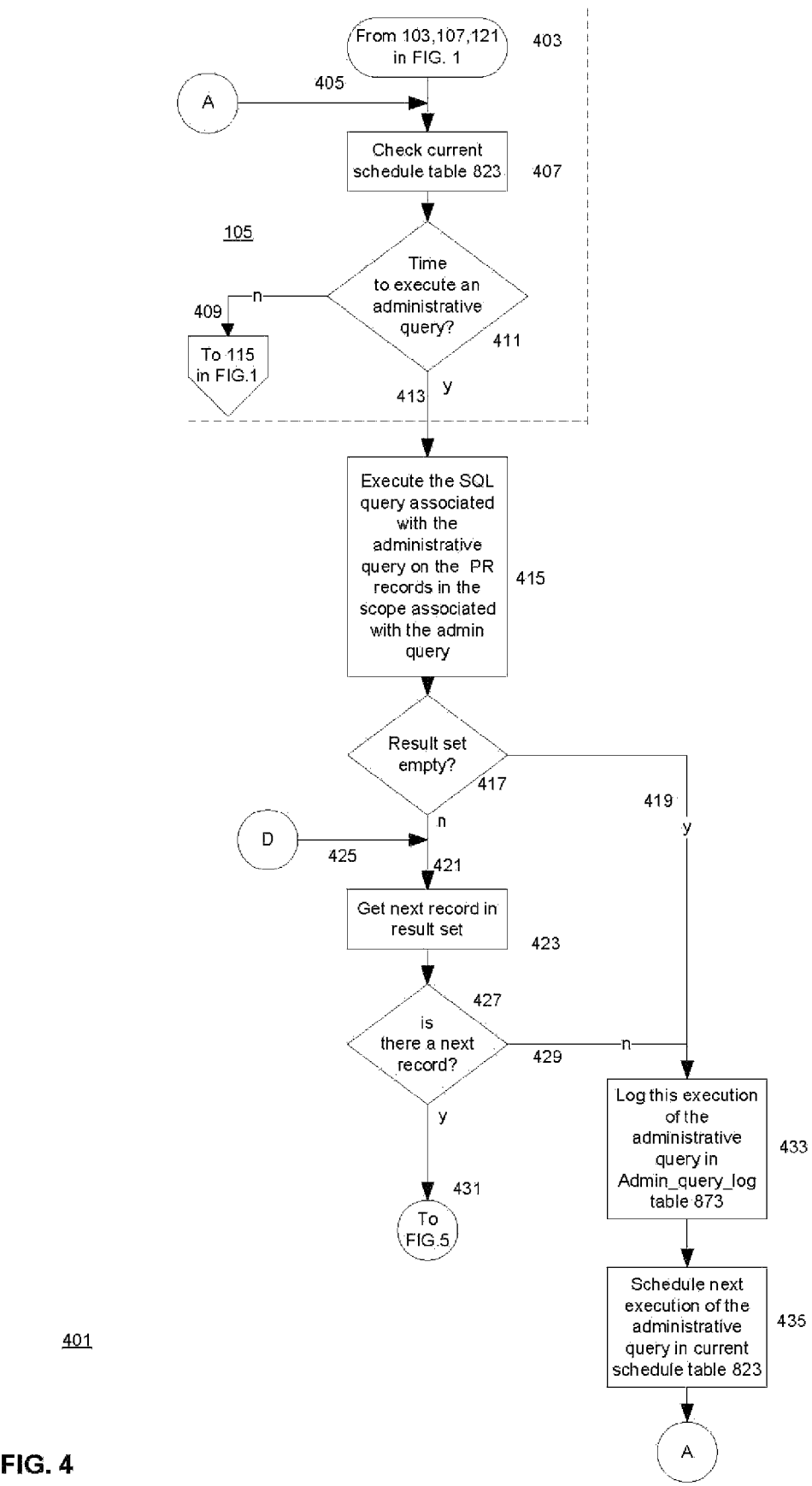
FIG. 4 shows a flowchart depicting the steps by which an exemplary embodiment of the present invention executes administrative queries.

Details of Administrative Query Execution: FIG. 4

FIG. 4 is a more detailed flowchart 401 of blocks 105 and part of block 113 of FIG. 1. The part of the flowchart inside the dashed line represents block 105; the remainder represents block 113. Flowchart 401 shows how system 801 executes the code of execution module 821 of system 801 to execute an administrative query, performs activities associated with the query, and schedules the next execution of the administrative query.

Beginning with start block 403, as set forth there, flowchart 401 may be entered by the paths indicated by 103, 107, and 121 in FIG. 1 The first step is checking current schedule table 823 (lock 407) for an administrative query that is scheduled to be executed at the current time; if none is found, it takes branch 409 from decision block 411 to decision block 115 in FIG. 1 to check if the configuration has changed. If there is an administrative query to execute at this time, it takes branch 413 to block 415.

The first step in that branch (block 415) is to execute the SQL query specified in the administrative query's record in Admin_query table 853, limiting the PR records the query is executed on to those specified in the projects specified in the administrative query's record scope. If the result set of PR records returned by the query is empty (decision block 417), branch 419 is taken: the execution of the query is logged in Admin_query_log table 873 (lock 433) and system 801 uses the information contained in the schedule specified in the administrative query's record to update the administrative query's record in current schedule table 823 with the time of the next execution of the administrative query and returns to block 407.

If the result set is not empty, each PR record in the result set must be processed and system 801 begins executing loop 425, which gets executed once for every PR record in the result set. First, the next PR record in the result set is fetched (423); if there are no more PR records in the set (decision block 427), branch 429 is taken to branch 419, and processing continues as described above for that branch. If there is a PR record to process, branch 431 is taken to FIG. 5.

Figure 5:
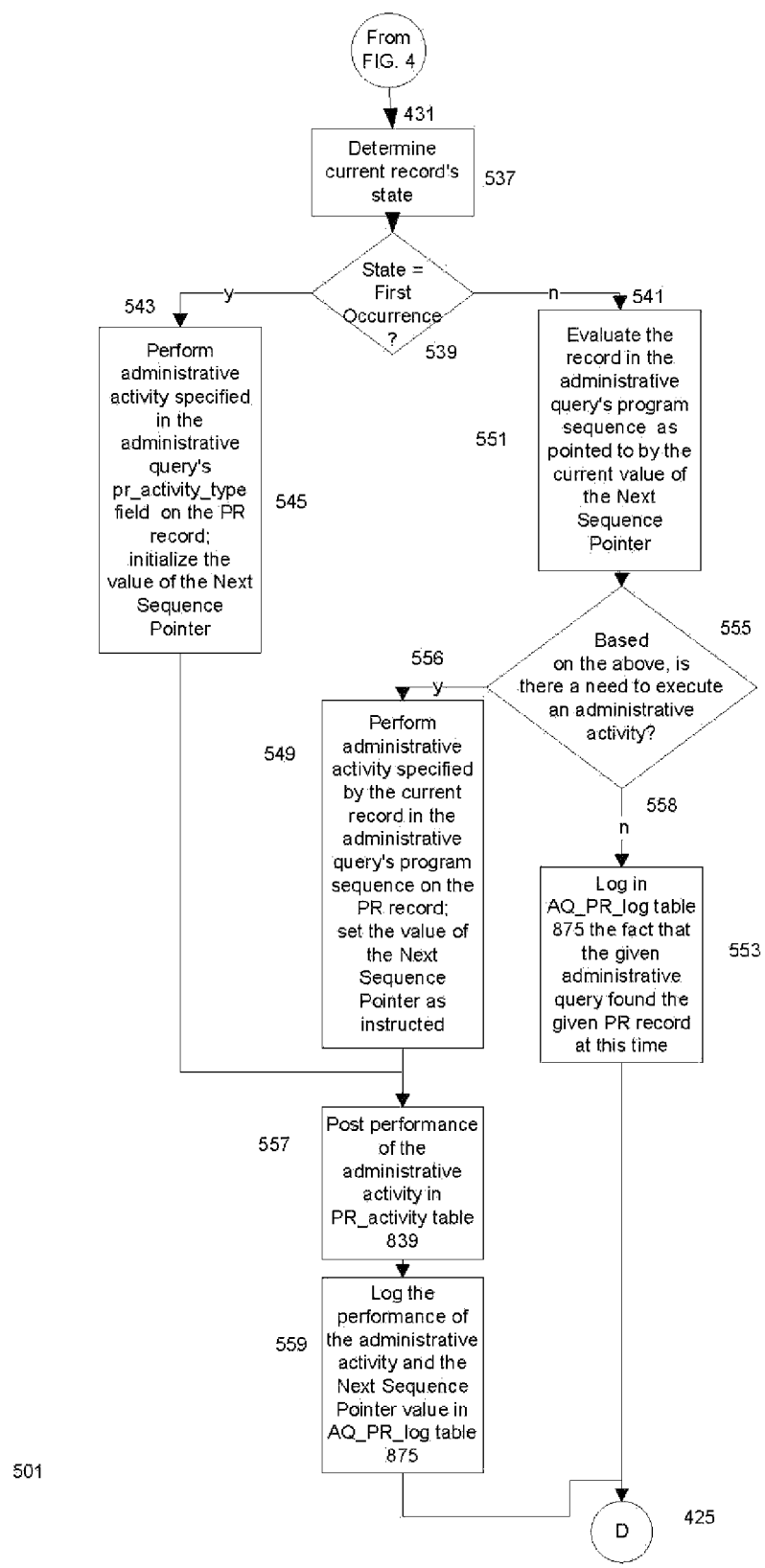
FIG. 5 shows a flowchart depicting the steps by which an exemplary embodiment of the present invention processes a result set.

Details of the Processing of a PR Record: FIG. 5

Processing of a PR record is shown at FIG. 5. As shown, block 537 determines the current record state; the next step (decision block 539) determines if the PR record is in the state of First Occurrence; if not, it is in the state of Persistent Conditions. As explained above, system 801 determines the state by examining the most recent execution record for the administrative query in Admin_query_log 873 and the most recent record for an execution of the administrative query with regard to the PR record in AQ_PR_log 875.

If the PR record is in the state of First Occurrence for that execution of the administrative query, system 801 takes branch 543 and performs the administrative activity whose Administrative activity type is specified in the field pr_activity_type of the administrative query's record in Admin_query table 853. That done, system 801 initializes the Next Sequence Pointer; in a preferred embodiment, it is initialized to 1 (545).

If the PR record is in the state of Persistent Conditions, system 801 takes branch 541. In that branch, it first evaluates the record in the administrative query's program sequence that is specified by the current value of the Next Sequence Pointer (block 551) to determine whether an administrative activity need be performed regarding the PR record on this execution of the query (decision block 555). If none need be performed, branch 558 is taken: a record for the current execution of the administrative query and the PR record is made in AQ_PR_log table 875, setting the date_aq_executed field to the date/time that the given administrative query was executed, and the next execution of loop 425 begins.

If the program sequence record specified by the current value of the Next Sequence Pointer indicates that the administrative activity specified in the program sequence record must be performed, system 801 takes branch 556; as set forth in block 549, system 801 performs the administrative activity and sets the value of the Next Sequence Pointer as indicated in the program sequence record. At this point, branch 543 and branch 556 come together; on both branches, the performed administrative activity is posted in PR_activity table 839 (block 557). Next, a record for the current execution of the administrative query, the PR record, and the performed administrative activity is made in AQ_PR_log table 875 (lock 559), setting the following fields principal fields in AQ_PR_log table 875: admin_query_id, pr_id, date_aq_executed, date_aa_executed, and pr_activity_type; after this, the next execution of loop 425 begins.

Conclusion

The foregoing Detailed Description has disclosed to those skilled in the relevant arts how to make and use a process control system that automatically provides as much monitoring as is desirable for the processes being controlled and has disclosed to those skilled in the relevant arts the best mode presently known by the inventors for implementing their process control system. The information needed to do the monitoring, including the queries that perform the monitoring and the activities to be performed in response to conditions detected by the queries, is all contained in tables in a database system. The fact that the information is contained in the database tables makes the process control system easily and safely configurable and extendable.

It will be immediately apparent to those skilled in the relevant arts that there are many other ways of implementing the invention. In particular, there are many ways in which the information needed to do the monitoring can be represented in the database system. Moreover, the information needed and the manner in which the process control system operates will both vary with the kind of process being monitored; in the preferred embodiment, the processes being monitored are business processes; other embodiments may monitor physical processes and the information in the database system, the manner in which it is organized, and the manner in which it is used to do the monitoring will all vary accordingly.

Since that is the case, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

The invention claimed is:

1. A process control system comprising:
   a server that includes a processor that has access to a database system, the processor executing program code for the process control system;
   a table of process records in the database system, each process record indicating a current status of a process being controlled by the system;
   a table of administrative query records in the database system, each administrative query record specifying an administrative query that is associated with a query on the table of process records and with a plurality of administrative activities; and
   the processor executing a portion of the program code which selects one of the administrative queries for execution, executes the query associated therewith, and performs an associated administrative activity of the plurality thereof with regard to a result set of the process records returned by the associated query; and
   a log table in the database system that has records logging executions of the query and process records returned thereby and from whose records the portion of the code can, when executed, determine whether a record belonging to the result set is in one of a plurality of states with regard to the current execution of the administrative query;
   wherein:
   which of the plurality of administrative activities is performed with regard to a record belonging to the result set depends on the state of the record.

2. The process control system set forth in claim 1 wherein:
   more than one of the administrative activities is associated with one of the states;
   the portion of the code can further, when executed, determine from the log table whether a record is in one of a plurality of substates of the one state; and
   which of the more than one of the administrative activities is performed with regard to a record belonging to the result state depends on which of a plurality of substates of the state the record is in.

3. The process control system set forth in claim 1 further comprising:
   a program sequence table in the database system that contains a set of program sequence records that are associated with the administrative query, each of the associated records specifying at least an administrative activity and a way of determining a next record in the set;
   and wherein
   the records logging the executions of the query and process records returned thereby further include a next sequence pointer for a given execution of the administrative query and a given process record, the next sequence pointer specifying a next record of the set of program sequence records,
   the portion of code, when executed, responding when a process record is again returned by a future execution of the administrative query by performing the administrative activity specified in the program sequence record specified by the next record pointer and setting the next sequence pointer as specified in the program sequence record.

4. The process control system set forth in claim 3 wherein:
   the program sequence record specifies that the next sequence pointer's value remains unchanged.

5. The process control system set forth in claim 1 wherein:
   an administrative activity associated with the administrative query includes one or more actions; and when the administrative activity is performed, the actions included therein are executed.

6. The process control system set forth in claim 5 wherein: there is a plurality of different types of actions that may be included in an administrative activity.

7. The process control system set forth in claim 6 wherein: the types of actions include actions which modify values in process records belonging to the result set when the activity in which the action is included is executed.

8. The process control system set forth in claim 6 wherein: the types of actions include actions which post a record for a process in a further table in the database system when the activity in which the action is included is executed.

9. The process control system set forth in claim 6 wherein: the types of actions include actions which generate a report listing the result set when the activity in which the action is included is executed.

10. The process control system set forth in claim 5 wherein there is a plurality of administrative actions and the process control system further comprises:
an action record table in the database system, each action record in the table representing an action associated with one of the administrative activities; and
when the associated administrative activity is performed, the portion of the program code executes the action records associated with the associated administrative activity.

11. The process control system set forth in claim 10 wherein:
there is a plurality of types of actions; and
there is a plurality of the action tables, each action table of the plurality thereof containing action records for actions of one type of the plurality thereof.

12. The process control system set forth in claim 1 wherein the administrative query record further specifies future scheduling information that is associated with the administrative query; and
the process control system further comprises;
a schedule accessible to the server that relates administrative queries to times for execution; and
when executed, the portion of the program code accesses the schedule to determine a time for a next administrative query to be executed, executes the next administrative query at the determined time on the table of process records to obtain a result set of the process records that are of interest to the process control system, and employs the executed administrative query's future scheduling information to update the executed administrative query's time for execution in the schedule.

13. The process control system set forth in claim 12 further comprising:
a future scheduling information table in the database whose records specify the future scheduling information,
the administrative query record for an administrative query specifying the future scheduling information by specifying a record in the schedule table.

14. The process control system set forth in claim 1 wherein:
the administrative query record further specifies scope information that defines a subset of the process records; and
when executed, the portion of the program code executes the query associated with the administrative query on the subset of the process records that is defined by the scope information associated with the administrative query.

15. The process control system set forth in claim 14 further comprising:
an administrative query scope table in the database system whose records specify subsets of the process records;
the administrative query record for an administrative query specifying the scope information by specifying a record in the administrative query scope table.

16. The process control system set forth in claim 1 further comprising:
an administrative query trend table wherein each record is associated with an administrative query and specifies an administrative action that is to be performed in response to a trend concerning the associated administrative query; and
when executed, the portion of code determines from the administrative query trend record associated with the administrative query being executed whether a trend exists and when so, performs the specified administrative action.

17. The process control system set forth in claim 1 further comprising:
a query table in the database system whose records specify queries on the process record table; and
an administrative activity type table in the database system whose records specify administrative activity types,
the administrative query record for an administrative query specifying the query on the table of process records by specifying a record in the query table and specifying the administrative action by specifying a record in the administrative activity type table.

* * * * *